SIGNAL CONVERTER FOR VIDEO DISPLAY SYSTEM

Filed July 13, 1961 12 Sheets-Sheet 1

INVENTOR.
GEORGE H. BALDING

BY Brown Jackson Boettcher & Dienner

SIGNAL CONVERTER FOR VIDEO DISPLAY SYSTEM

Filed July 13, 1961 12 Sheets-Sheet 2

TERRAIN PROFILE GENERATOR SYSTEM FIG. 4

INVENTOR.
GEORGE H. BALDING

BY Brown, Jackson, Boettcher & Dienner

SIGNAL CONVERTER FOR VIDEO DISPLAY SYSTEM

Filed July 13, 1961

INVENTOR.
GEORGE H. BALDING

BY Brown Jackson Boettcher Dienner

April 12, 1966 G. H. BALDING 3,246,330

SIGNAL CONVERTER FOR VIDEO DISPLAY SYSTEM

Filed July 13, 1961 12 Sheets-Sheet 4

INVENTOR.
GEORGE H. BALDING
BY Brown, Jackson, Boettcher & Dienner

April 12, 1966 G. H. BALDING 3,246,330

SIGNAL CONVERTER FOR VIDEO DISPLAY SYSTEM

Filed July 13, 1961 12 Sheets-Sheet 5

INVENTOR.
GEORGE H. BALDING
BY Brown Jackson Boettcher & Dienner

INVENTOR.
GEORGE H. BALDING
BY Brown, Jackson, Boettcher & Dienner

INVENTOR.
GEORGE H. BALDING
BY Brown, Jackson, Boettcher & Dienner

INVENTOR.
GEORGE H. BALDING
BY Brown, Jackson, Boettcher & Dienner

INVENTOR.
GEORGE H. BALDING
BY Brown, Jackson, Boettcher & Dienner

April 12, 1966 G. H. BALDING 3,246,330

SIGNAL CONVERTER FOR VIDEO DISPLAY SYSTEM

Filed July 13, 1961 12 Sheets-Sheet 10

INVENTOR.
GEORGE H. BALDING
BY Berry Jackson Boettcher & Dunne

READ IN

| RANGE GATES | STOR DEVICE | BIN 1 | 2 | 3 | 4 | 5 | 6 | 7 | 8 | 9 | 10 |
|---|---|---|---|---|---|---|---|---|---|---|---|
| 10 | SDJ | 5 V | | | | .0V | | | | | |
| 9 | SDI | 5 V | | | | .5V | | | | | |
| 8 | SDH | 5 V | | | | .5V | | | | | |
| 7 | SDG | 5 V | | | | .5V | | | | | |
| 6 | SDF | 5 V | | | | .5V | | | | | |
| 5 | SDE | 5 V | | | | .5V | | | | | |
| 4 | SDD | 5 V | | | | 3.5V | | | | | |
| 3 | SDC | 6.2V | | | | 5.5V | | | | | |
| 2 | SDB | 6.2V | | | | 7.0V | | | | | |
| 1 | SDA | 8.3V | | | | 8.0V | | | | | |

READOUT

| | | | | | | | | | |
|---|---|---|---|---|---|---|---|---|---|
| BIN 1 SDA-J | | | | BIN 5 SDA-J | | | | | |

*INVENTOR.*
GEORGE H. BALDING

SIGNAL CONVERTER FOR VIDEO DISPLAY SYSTEM

*INVENTOR.*
GEORGE H. BALDING

United States Patent Office 3,246,330
Patented Apr. 12, 1966

3,246,330
SIGNAL CONVERTER FOR VIDEO DISPLAY SYSTEM

George H. Balding, Fremont, Calif., assignor, by mesne assignments, to Kaiser Aerospace & Electronics Corporation, Oakland, Calif., a corporation of Nevada Filed July 13, 1961, Ser. No. 126,436
43 Claims. (Cl. 343—7.9)

The basic converter device disclosed herein was originally set forth in my copending application Serial No. 728,019 which was filed on April 11, 1958 and issued as U.S. Patent 3,093,822. The present application constitutes a continuation-in-part of the aforeidentified application.

The present invention is directed to a novel signal converter for a video display system, and specifically to a system for providing an improved display of radar information on a video display device.

The principal function of a radar display converter is to store information which is obtained by a radar unit, such as is used on aircraft and the like, and to convert such signals for viewing by an observer on video display means, such as a cathode ray tube.

The conversion of the radar signals to signals which may be used with a display arrangement creates a basic problem by reason of the fact that most radar scans are accomplished at a relatively low frequency rate (such as 1 cycle/sec.), whereas the signals displayed on a cathode ray tube which operate in accordance with conventional television techniques, are normally of a relatively high frequency (i.e., horizontal line scans at the rate of 15,750 cycles/sec. at a vertical rate of 60 cycles/sec.).

The problem of providing a display of the low frequency signals on a cathode ray tube was previously solved by utilizing cathode ray tubes which have a target comprised of phosphor of an extremely long persistence, whereby the information provided by one antenna scan is immediately displayed on the screen and by reason of the phosphor persistence, remains on the display for viewing until such time as a further set of signals is detected by the radar during the next antenna scan. Unfortunately, such method results in a very high brightness of the phosphor image at the positions on the display which correspond to the instantaneous location of the antenna, and a very low brightness of the portion of the phosphor which is about to be scanned. As a result, the observer must have a hood or a darkened viewing position in order to discern the information on the portion of the tube having the diminished brightness. At best, the continuing variation of the brightness of the different segments of the display is extremely difficult to view, and accordingly decreases the reliability of use of the device in the field. Manifestly the consequences of errors which may occur in the use of such type equipment may be of an extremely serious nature.

It is an object of the present invention, therefore, to provide a new and novel radar display converter system which provides a display of increased brightness to the viewer, and which is particularly operative to provide a display system which includes means operable to provide a display of increased brightness on all areas of the display presentation independent of the position of the radar antenna.

It is another object of the invention to provide a novel radar display converter system having means for converting signals detected at a low frequency rate to signals which are compatible for use in modulating a high frequency raster scan of a display device, such as a cathode ray tube, to thereby provide a display which includes the viewing advantages of commercial home television receiver sets.

It is still another object of the invention to provide a radar converter system which is of a more inexpensive structure, and which is operative with existing radar installations. In one form of radar information display, identified hereinafter as a terrain profile display, it is necessary to provide a display of the terrain which lies in the immediate path of the aircraft, the display in effect being a display of information sensed by a narrow beam which is deflected vertically in a plane which lies in the path of the aircraft, and the beam in such movement detecting the height of the obstructions at different ranges in the vertical plane.

It is a further object of the present invention therefore to provide a novel radar display converter which includes means operable responsive to the receipt of radar signals indicative of the height of the terrain at different vertical angles of the radar scan in a plane to generate a set of high frequency signals for modulating a cathode ray tube raster to provide a profile display of the terrain information provided by such signals.

It is yet another object of the invention to provide a radar display converter which includes range line circuit means for providing vertical range lines superimposed on the profile display to provide marked indications of the location of the various contours in the profile relative to the position of the aircraft.

It is an additional object of the invention to provide a radar display converter which is operative to provide a terrain profile display including constant altitude line circuit means for generating a horizontal line on the display as an aid to the pilot in determining the minimum safe altitude in flight for a particular heading, and means for providing a second horizontal line superimposed on the display to continually indicate the altitude of the aircraft relative to the terrain profile display.

It is a further object of the invention to provide a novel radar display converter which includes commutating means for dividing the signals received in a given antenna scan into segments, including means for coupling each different segment to a different storage bin, and novel readout means including a plurality of sampling means connected to operate in sequence to generate sampling signals at the horizontal frequency rate of a raster, signal derivation means including means connected to each of said bins to derive a representative signal therefrom without varying the value of the signal thereon, and means for coupling the sampling signals to said signal derivation means to control same to provide a set of readout signals at the horizontal line frequency rate.

In a second form of display, referred to hereinafter as a terrain clearance display, the radar antenna beam is electronically scanned through vertical planes from the foreground to the horizon at a 2400 cycles per second rate continually as the antenna is being mechanically swept horizontally through a sector of approximately 60 degrees of azimuth. The radar system in such manner of operation provides information consisting of azimuth and range data, the radar return echoes being functions of terrain elevation, antenna depression angle and azimuth.

It is a further object of the invention to provide a novel converter system which is operative in response to receipt of radar signals in a terrain clearance type system to provide a pictorial display on a cathode ray tube raster of the terrain which lies in a sector forward of the aircraft, and which presents such display of the terrain for viewing in the same manner that the eye of the viewer would observe the terrain through the windshield of the aircraft.

It is still another object of the invention to provide a novel converter system in which the display comprises a series of azimuth terrain profiles which are consistent with the real world terrain profiles in a given sector forward of the aircraft, and particularly in which each profile displayed appears at a different range, the different ranges being shaded in different degrees to provide the illusion of depth and perspective and thereby assist in distinguishing between the different ranges.

It is a further object of the invention to provide a novel radar converter display for use in providing a terrain clearance display responsive to receipt of signals from a radar system which is simultaneously operative to scan in a vertical and horizontal direction, and which includes range gate means for segmenting the vertical scan for each azimuth into "$n$" different segments, whereby the signals received in each segment in effect represent the altitude at a different range, a plurality of storage means, each of which is connected to store a different segment (or range) of each vertical sweep including switching means operative to divide the signals provided to each storage means by its associated range gate means in an azimuth sweep into "$p$" segments, each of which segments is coupled to a different storage bin in the storage device, whereby each bin in a storage device provides a signal which represents the maximum terrain height at a given range in a given azimuth sector.

It is yet another object of the present invention to provide a novel readout circuit for use with the terrain clearance generator which is operable to effect readout of the signals stored in the bins of the storage devices in a predetermined sequence comprising readout gate means for effecting the simultaneous readout of the signals on the first bin of each storage device for a first interval of each horizontal trace of the raster (1/No. of storage bins), and simultaneously coupling the signals thus obtained to a like number of different terrain clearance circuits, each of which includes means for mixing its received storage signal with a vertical sawtooth signal, clipping the combined signal at a predetermined level, and coupling of the combined signal to a display device for presentation thereon.

It is a further object of the present invention to provide a novel signal conversion system which is operative to store a large number of different bits of information in a storage device (the information representative signals being coupled to the storage device at either a slow or fast frequency rate), and which is further operative to provide a visual display of such information on a display device, such as a cathode ray tube. By way of example, the novel conversion system may be used with communication systems, telemetering systems, supervisory control systems, monitoring systems, inventory systems, and the like, in which a large number of bits of information representative of different conditions of different equipment or intelligence may be sampled and converted to signals operable to provide a visual display of the information on a visual display device.

The foregoing objects and features of the invention and others which are believed to be new and novel in the art are set forth in the following specification and drawings in which.

Figure 4:
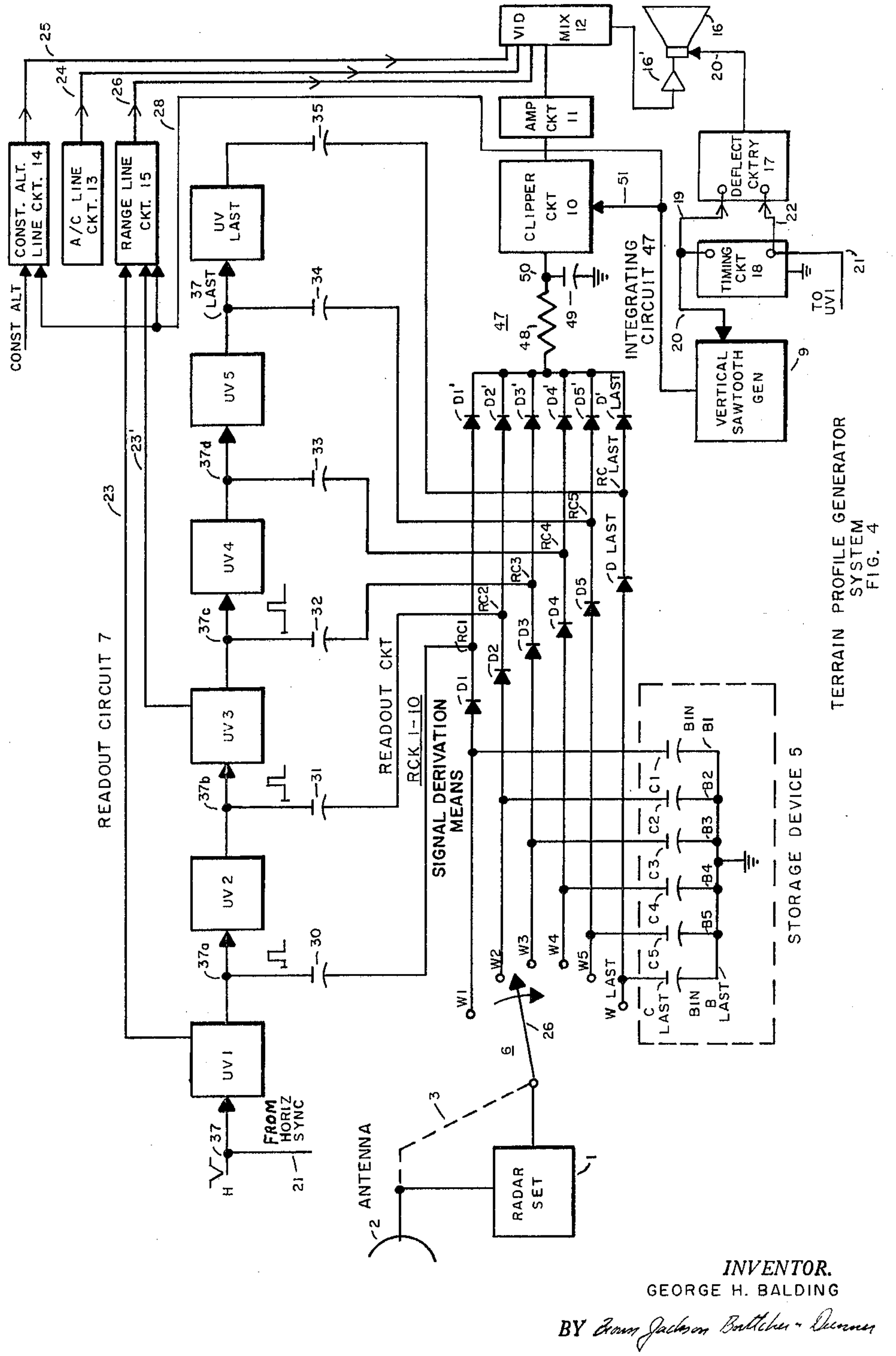
FIGURES 4, 5 and 6 are specific diagrams of the terrain profile generator circuitry.
Figure 10:
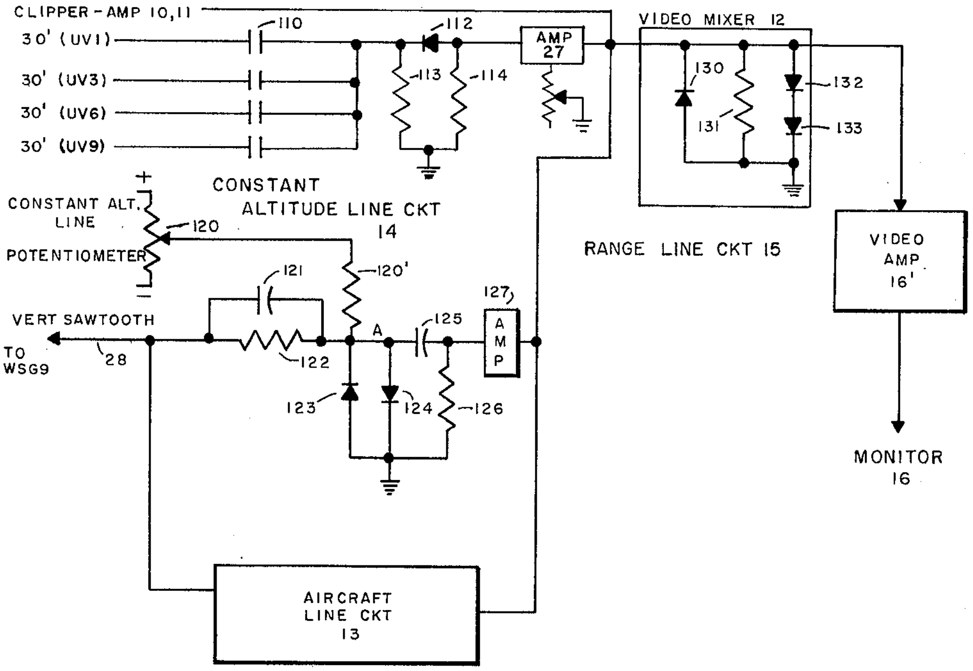
Figure 11:
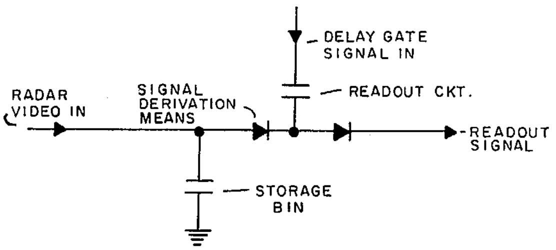
Figure 18:
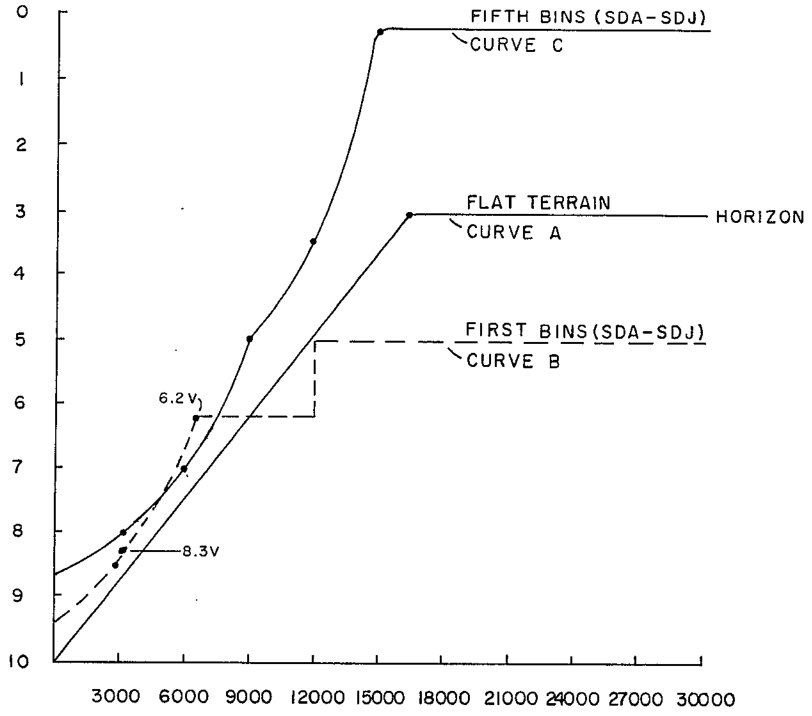
Figures 17, 19, 20:
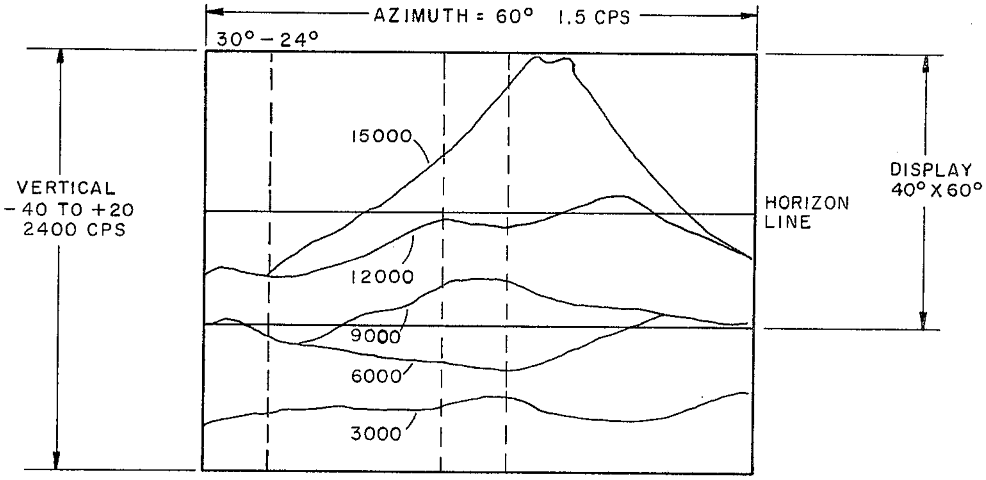
Figure 21:
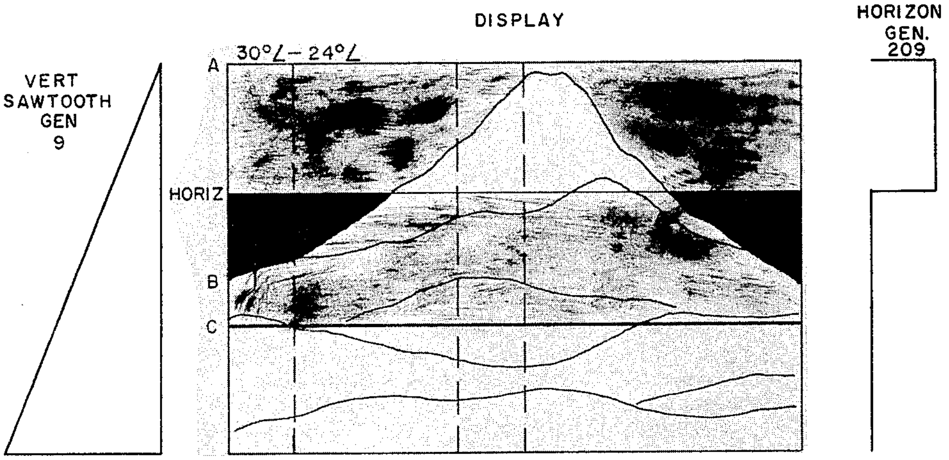

FIGURES 9A–9D set forth the manner in which a waveform coupled to the clipper circuit provides video output signals of different values in successive line traces of the raster on the display device;

FIGURE 10 is a circuit diagram of the range line circuit, constant altitude line circuit and aircraft line circuit used with the terrain profile generator of FIGURE 4;

FIGURE 11 is a simplified illustration of the novel storage and readout circuit used in the terrain profile and terrain clearance generators of the disclosure;

FIGURES 12–16 set forth the circuit diagram of the novel terrain clearance generator system of the invention;

FIGURE 17 is a pictorial representation of a terrain contour which is provided for exemplary purposes;

FIGURE 18 is a graphic illustration of signals which may be provided by a radar set with detection of the terrain of FIGURE 17;

FIGURE 19 is a chart of the manner in which the signals shown in FIGURE 18 are stored by the system;

FIGURE 20 is a sequence chart of the manner in which the signals are "read-out" of the system; and FIGURE 21 is a pictorial showing of the terrain clearance display provided by the converter system with the coupling of the signals of FIGURE 19 thereto including a showing of the sawtooth waveform and the horizon generator waveform which are generated to provide such display.

TERRAIN PROFILE DISPLAY GENERATOR SYSTEM

*General description—Operation*

A terrain profile display system is basically operative to display signal information which is derived or provided by a radar system (or simulator) which is operative to scan a "slice" of terrain lying in a vertical plane in the path of an aircraft, the plane scanned being determined by the extent of the vertical scan of the antenna and the antenna azimuth. The antenna is driven in its vertical scan at a relatively low rate (approximately 1 cycle/sec.), and the signal output of the radar system resulting from such scan is coupled to the novel converter for conversion to signals which may be coupled to the electron gun of a cathode ray tube which is being operated at the relatively high video rates of scan employed in conventional home television type receiver sets. In most installations the radar antenna is pitch stabilized so that small variations in pitch do not effect the profile display on the viewing device.

Figure 1:
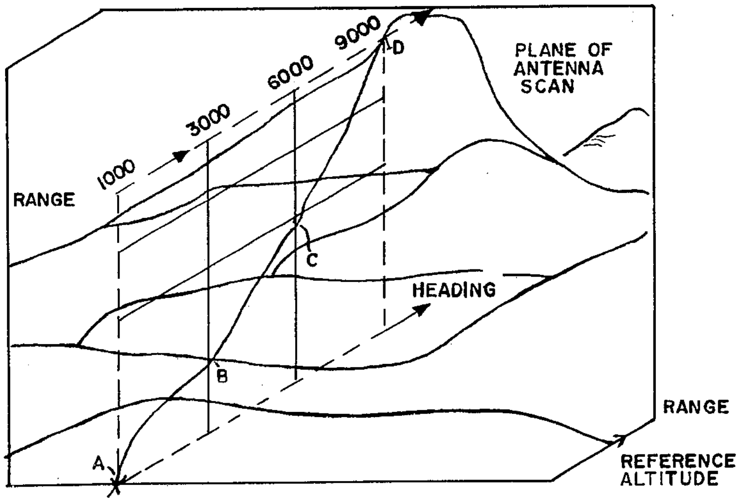
FIGURE 1 is a pictorial representation of a terrain contour which is provided for exemplary purposes.

For purposes of example, a representative terrain which may be experienced in a mountainous terrain is set forth in FIGURE 1, the dotted line representation being provided to indicate the manner in which the aircraft radar antenna would be operative to scan a slice of the terrain which lies in the direct path of the aircraft and which is represented by the plane shown in dotted lines. The exact nature of the plane of the scan is, of course, further determined by the extent of vertical displacement of the antenna in each scan, and the antenna bearing relative to the line of flight of the aircraft.

Manifestly, the signals provided by the conventional radar system in its vertical scan will be functions of the terrain elevation and distance which lie in the aircraft path, the radar video output signals generated by the radar being a voltage whose amplitude is a function of antenna elevation angle and range to the terrain.

Figure 2:
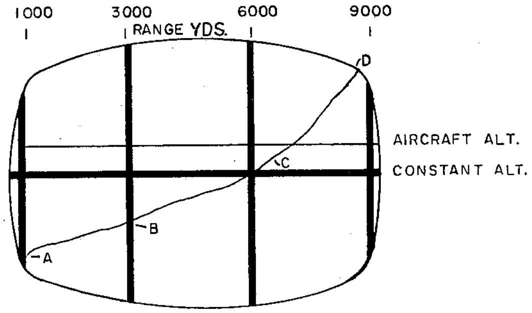
FIGURE 2 is a pictorial representation of a display provided by the novel terrain profile radar converter of the present disclosure for the terrain of FIGURE 1.

The general manner of operation of the novel terrain profile converter will be best apparent with reference to FIGURE 2 which sets forth a display path as will be presented to the pilot of the aircraft which is in the relative position shown in FIGURE 1. It will be immediately apparent that the terrain as displayed constitutes a true profile of the terrain which is located at the different ranges in the path of the aircraft. The avoidance of such terrain is manifestly simplified for the pilot having a visual aid of such type.

According to a further feature of the invention, the converter also generates signals which provide vertical range lines on the display for the purpose of providing an indication to the pilot of the distance of the different objects which are presented on such display relative to the aircraft. In the display of FIGURE 2, for example, the span between the first pair of range lines is representative of a range of 2000 yards and the span between successive pairs is representative of a range of 3000 yards, the distance represented by the range lines being readily variable to different values in different installations as shown hereinafter.

As a further aid to the pilot, one horizontal line is traced on the display to continually indicate aircraft altitude, and thereby provide a relative indication of the aircraft altitude relative to the terrain shown on the display. As shown in FIGURE 2, if the line of flight were maintained the altitude of the aircraft is such that at seven thousand yards the aircraft would encounter the illustrated terrain. As the aircraft altitude changes, the terrain on the display will be vertically displaced in a corresponding manner, to thereby continually provide an indication of the aircraft altitude relative to the terrain displayed. The converter also generates a constant altitude line which is adjustable in position by the pilot, and which is used to show some fixed altitude as a preset reference which indicates the minimum altitude at which terrain clearance over obstacles in the path of the aircraft is assured. As shown in FIGURE 2, the constant altitude line is not set to avoid the highest obstruction in the aircraft path. The constant altitude line as generated by the converter is of a wider width than the aircraft altitude line to facilitate distinguishing there between.

*General description—Structure*

As indicated above, the novel terrain profile generator is utilized with a radar system which is operative to scan the terrain which lies in a narrow plane which extends in the path of the aircraft and to provide a radar video output signal having a voltage whose amplitude is a function of antenna elevation angle and range to the terrain. In that the antenna is operated at a one cycle per second rate, the information representative signals relative to any given position on the scan is repeated at such rate. Since these low frequency signals must be displayed on a display unit, such as a cathode ray tube, in which a raster type scan is used having a horizontal sweep rate of 15,750 cycles per second and a vertical sweep rate of 60 cycles per second, the converter must be operative to convert the signals received from the antenna at the low frequency rate to signals which occur at the higher rate to permit the presentation thereof on the raster scan.

Figure 3:
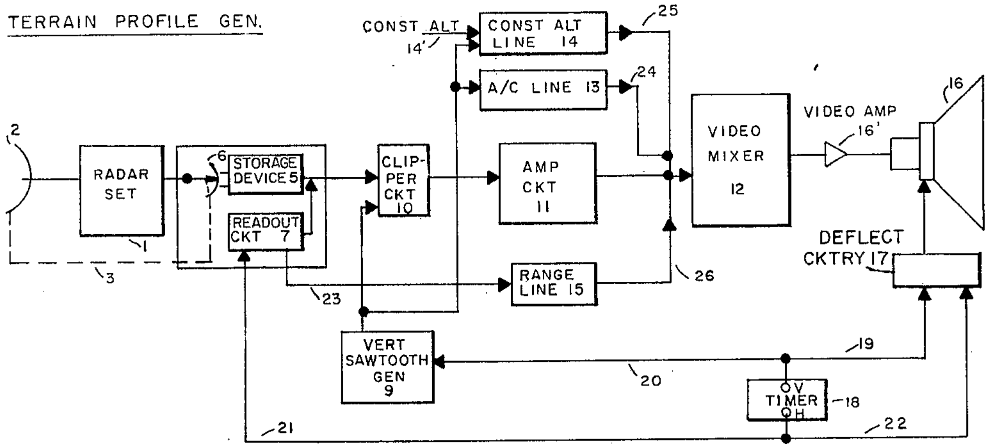
FIGURE 3 is a block diagram of the circuitry of the novel terrain profile generator.

With reference to FIGURE 3, the system block diagram for the terrain profile generator is set forth thereat. As there shown, a radar set 1 includes an antenna 2 which is operative in a vertical plane at the one cycle per second rate to scan the terrain directly in front of the aircraft. The information thus obtained by radar set 1 is coupled to a switch 6 which divides the signals received into different segments (ten in the present example) and couples each of the radar video signal segments into separate storage bins in storage device 5. The division of the signals of each scan into different signals is accomplished by a rotating switch 6 which is synchronized to cycle once with each scan of the antenna 2, a suitable link (represented by the dotted lines) effecting the synchronous operation of the antenna 2 and the switch 6.

Storage device 5 includes a number of bins which are related to the number of signal segments obtained in each antenna scan. In an arrangement having a switch 6 which divides each radar signal set (one scan of the antenna 2) into ten segments, the storage device 5 will have ten storage bins, each storage bin being connected to a different contact position to thereby store a different segment of each radar signal set. Since the radar signals received in a set are a function of the terrain height at the different angles of scan, and the position of switch 6 relative to its contacts is always related to the angle of scan of the antenna, each of the different bins stores a direct current voltage which is proportional to the closest terrain at a fixed different angle of scan.

A novel readout circuit 7 is controlled by horizontal sync pulses received from the timer circuit 18 for the cathode ray display tube 16 to read out the information stored on each of the ten bins at the rate of the horizontal line trace of a conventional television raster. Stated in another way, in each horizontal trace of the raster beam for the display tube readout circuit 7 samples the information stored on each bin, the sampling or readout of the information on each of the bins being effected in a predetermined, fixed sequence and requiring a time period for the total readout of all the bins which is related to the duration of one horizontal trace of the raster (63 $\mu s$). The amplitude of each readout pulse provided by the readout circuit is a function of the direct current voltage which is stored in the storage bin, and as the sequential readout of the bins occurs in each horizontal trace, a video pulse train (a series of pulses trailing one another) is provided whose total shape or profile will be related to the range of the terrain scanned by the radar antenna at the successive angles, and such pulse train will have the frequency rate of the horizontal trace of the display unit.

The readout signals as provided are next converted to video signals in the manner described in detail in the aforeidentified copending application. That is, the wave trains which occur at the horizontal rate are mixed in a mixer circuit in clipping circuit 10 (shown in more detail in FIGURE 6) with a sawtooth waveform provided by a vertical sawtooth generator 9, the generator 9 being synchronized with, and having the frequency of, the vertical scan of the display unit. The mixed signals are passed through the clipping circuit 10 which passes the higher amplitude portions of the pulse train during the initial portions of the raster, and the progressively lower amplitude portions of the pulse train as the raster progresses (along with the higher amplitude portions) at the vertical scan rate to the lower portion of the raster.

The clipped signals are amplified in amplifier 11 and coupled to a video mixer circuit 12 where the signals generated by the aircraft altitude line circuit 13, the constant altitude line circuit line circuit 14, and range line circuit 15 are intermixed for coupling over video amplifier 16' to the electron beam gun of a display device, such as illustrated cathode ray tube 16. The cathode ray tube 16 is operative to provide a raster scan in accordance with known television techniques, a deflection circuit 17 being operative to provide the horizontal and vertical deflection voltages for the beam, and the timer circuit 18 being operative to provide horizontal and vertical sync signals for the deflection circuitry 17, vertical sync signals for the vertical sawtooth generator 9 and horizontal sync signals for the readout circuit 7. The cathode ray tube 16 may be of the type commercially available as a 14WP–4 and the deflection circuitry 17 may be circuitry which is conventionally used to control the horizontal and vertical deflection of the electron beam to provide a raster scan on the screen of the tube. Timing generator 18 may be of the type conventionally used in commercial television equipment which is operative to provide horizontal sync pulses at the rate of 15,750 cycles per second and vertical sync pulses at the rate of 60 cycles per second. Video amplifier 16' may comprise a conventional video amplifier commercially available in the field for use with the illustrated cathode ray tube 16.

It will be apparent that the signal converter circuitry (i.e. exclusive of circuits 14, 15, 16) described hereinbefore is substantially as set forth in FIGURE 20 of the above identified patent which issued on my copending application having Serial No. 728,019 which was filed April 11, 1958, and constitutes the basic portion of the circuitry included in the present application.

Aircraft altitude line generator circuit 13 which is used to indicate the altitude of the aircraft at any given instant (and in its projection, to show the terrain that might rise above the flight line of the aircraft), includes a signal generator which is operative to generate a pulse which is synchronized with the vertical scan of the raster. The output signal of the aircraft line generator circuit 13 is coupled over conductor 24 to the video mixer 12 for mixing with terrain profile signals and coupling over video amplifier 16′ to the cathode ray tube 16 to provide an aircraft altitude line as shown in FIGURE 2.

A constant altitude line generator circuit 14 includes circuitry adjustable to provide a preset altitude reference for the purpose of establishing minimum terrain clearance indication on the display device. The signal is generated in the same manner as the aircraft altitude line, the line being of an increased width so as to aid in distinguishing between the two lines. An adjustable control signal is provided over input circuit 14′ to permit adjustment of the time of generation of the line during each vertical trace. The output of the constant altitude line generator circuit 14 is coupled over conductor 25 to the video mixer 12 for mixing with the terrain profile signals and coupling over video amplifier 16′ to display unit 16 to provide a constant altitude line, as shown in FIGURE 2, which is adjustable to different positions on the raster display.

Range line circuit 15 is connected over conductor cable 23 to the readout circuit 7, and is controlled to generate a video pulse in synchronism with the occurrence of each of certain of the readout pulses. In the illustrated embodiment, for example, cable 23 includes four conductors over which four range pulses are coupled in synchronism with four pulses of the ten readout pulses generated during each horizontal trace, the range pulses occurring at the time of generation of the first, third, sixth and ninth readout pulses to provide representation of distances between range lines equivalent to a two-thousand yard spacing between the first two range lines and a three-thousand yard spacing between each subsequent pair of vertical lines. Coupling of the four range pulses over cable 23 to range circuit 15 and over conductor 26 to the video mixer 12 and video amplifier 16′ to display device 16 during each horizontal trace provides four vertical lines on the viewing screen as shown in FIGURE 2.

*Specific description of terrain profile generator system*

The terrain profile generator system as noted in the general description above is a two-dimensional terrain profile presentation which in effect provides a plot of elevation as a function of range in a fixed azimuth plane, which plane in most aircraft installations, is the heading of the aircraft. A typical plane of scan is shown by the dotted lines in FIGURE 1.

A specific embodiment of the novel terrain profile generator system of the invention is shown in FIGURES 4–10, and as there shown the system basically includes a radar set 1 having an antenna 2 which is operated by mechanical means (not shown) through a vertical plane in the direction of flight to obtain radar echoes which are functions of the terrain elevation and distance. In the illustrated installation, the antenna 2 is operated through a twenty-five degree sector which ranges from plus ten degrees to minus fifteen degrees (relative to the horizontal projected axis of the flight of the aircraft) and back in a period of 1.5 seconds.

Figure 7:
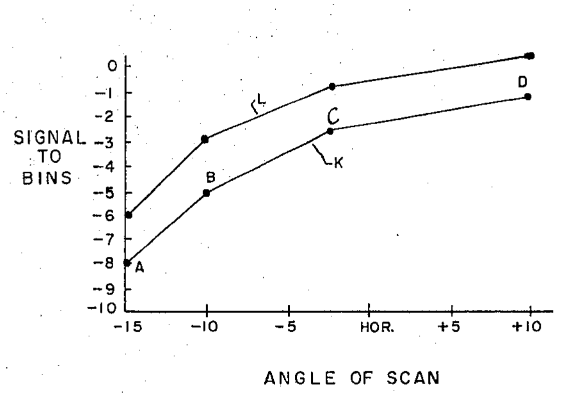
FIGURE 7 is a graphic exemplary illustration of signals which may be provided by a radar set for flat terrain conditions and the exemplary terrain shown in FIGURE 1.

As indicated by one exemplary curve K of FIGURE 7, as the antenna 2 is directed from minus fifteen degrees in the direction of plus ten degrees, and assuming that the aircraft is over the terrain shown in FIGURE 1, the radar system provides a signal in the order of −8 volts and as the antenna continues in its upward movement, a signal of increasingly positive amplitude is generated by the radar system 1 for coupling to the radar converter device. A correspondingly different set of signals is provided by the radar as shown in FIGURE 7, curve L, if the aircraft is at a lower altitude. Radar equipment for providing signals representative of the range to the terrain in a given vertical plane is known in the art, for example, Radar Set AN-APQ 53A disclosed in Service Instruction Manual, Navy No. NW16–30, APG 53–502 published September 1, 1959. As noted above, the novel terrain profile converter unit of the present invention is adapted to convert the signal output as provided by such radar system 1 into signals which may be presented on the raster display of a cathode ray tube which is operated in accordance with standard home television techniques. The converter unit for the terrain clearance unit has utility with Radar Set AN/APQ–92 available from Norden Division United Aircraft Corp. Norwalk, Connecticut. The converter also has utility with any simulator or other device which provides input signals of the type set forth in more detail hereinafter.

More specifically, with reference to FIGURE 4, the signal output of the radar set 1 in a vertical scan (such as for example, the signals shown in curve K of FIGURE 7) are coupled to a switch 6 which commutates or divides the signals provided by the radar set 1 into $n$ different segments, each signal being stored in a different one of $n$ bins B1–B$n$ of a storage device 5.

In the present embodiment $n=10$ and accordingly commutator switch 6 has ten contact positions W1–W10 ($n=10$) and a wiper 26 which is connected to the output circuit of the radar set 1 (in most instances, over an emitter-follower circuit, not shown, for loading matching purposes). As indicated by the dotted lines extending between the antenna 2 and the wiper 26, the wiper 26 is driven over its $n$ associated contact positions, W1–W10, in synchronism with the movement of the radar antenna 2 through each scan. The signals provided by the radar set 1 as the antenna is operated through each scan are therefore divided into ten separate segments as wiper 26 moves over the ten different ones of its contact positions W1–W10.

Each contact position W1–W10 of the switch 6 is connected to a different one of a plurality of bins B1–B10 in storage device 5. Each storage bin in the present arrangement as shown in FIGURE 4 comprises a capacitor C1–C last (or C$n$), although it will be immediately apparent that other signal storage devices such as ferrite cores, magnetic storage devices, and others may be used in the manner of the capacitor members for storage purposes. The term "bins" as used herein is therefore considered to be generic to storage elements other than and including the illustrated capacitor devices C1–C last.

In operation, as each vertical sweep of the antenna 2 is initiated, the output signals of the radar system 1 will be coupled over wiper 26 of switch 6, and contact position W1 on the switch 6 to the capacitor C1 in bin B1 of storage device 5.

Since the incoming signals provided by the radar system 1 are continually proportional to the terrain height detected, the capacitor C1 is provided with a signal which represents the profile of the terrain as detected by the radar system 1 during the initial sector (or segment) of scan. As the antenna is depressed through a further angle of scan (from plus ten degrees in the direction of minus fifteen degrees), the wiper 26 of switch 6 advances in synchronism, and after each successive segment of angular depression of the antenna (movement of 2.5 degrees in every .075 second), the signals indicative of the terrain height at the corresponding segment or sector of antenna scan will be coupled to the particular one of the bins B1–B10 which is connected to the radar system at the time. Manifestly at the end of each scan, signals representative of the ten different sectors of the scan are registered on capacitors C1–C10 of bins B1–B10 in the storage device 5.

The information representative of the profile of the terrain directly in the path of the aircraft as stored on the bins of the storage device 5 is read out of the bins repeatedly at a high frequency rate for coupling to the electron beam gun of the display device 16. In that multiple repetitive readouts of the signal set in each bin are required by reason of the high frequency scan of the raster, the storage device 5 is connected to permit read out of the signals registered in the storage bins B1–B10 as many times as may be required without effecting deterioration of the signals which are stored therein.

Figure 8:
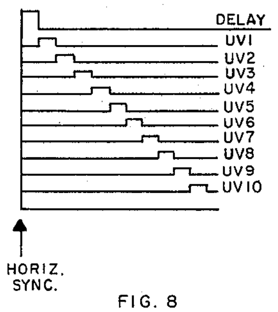
FIGURE 8 is a time sequence chart setting forth the relative periods of operation of the delay gates UV1–UV10 in the terrain profile generator of FIGURE 4.

The readout circuit 7 which accomplishes the readout of the signals stored on bins B1–B10 basically comprises a plurality of *n* delay or sampling gates UV1–UV last which are connected in a cascade arrangement, ($n$=10 in the present embodiment) each one of the delay gates UV1–UV last being connected to provide a signal which effects read out of the information on a different one of the storage bins B1–B10 at a successive time interval in each horizontal line trace on the raster (see FIGURE 8).

Each delay gate, such as UV1, is basically comprised of a one-shot multivibrator which is operative as energized to generate a positive square wave pulse (which in the present embodiment is of a ten volt amplitude) and to couple such pulse to an individual readout circuit, such as RCK1, for an interconnected one of the bins, such as B1, in the storage device 5. Each readout circuit, such as RCK1, comprises a coupling capacitor 30 and a diode D1′ connected to a readout conductor, such RC1. A signal derivation or coupling diode D1 is connected to the junction of the capacitor C1 and diode D1′ in the readout circuit RCK1 to provide a representative signal from the capacitor C1 to the readout circuit (Also see FIGURE 11). Such connection is important in that it permits over a hundred thousand readouts of the signal without requiring replenishment of the stored signal by the radar system. It will be apparent that signal derivation diode D1 may be replaced by other signal derivation means, such as a high resistance member, if desired.

The output signal of each delay gate, such as UV1, is also connected over a capacitor (see capacitor 68, FIG. 5, for example) in the input circuit of a succeeding one of the delay gates, such as UV2, in the sequence, the trailing edge of each square wave pulse of a gate initiating the generation of a pulse by the succeeding delay gate in the sequence, which in turn energizes its readout circuit RCK2 to effect the readout of the signal on the particular storage bin, such as B2, which is connected thereto.

The start signal for the cascade set of gates UV1–UV10 is coupled to the first gate UV1 over conductor 21 by the timing circuit 18 each time that a horizontal sync signal is coupled to the deflection circuitry 17 to initiate a line trace on the raster of the display device 16. In the illustrated embodiment, a negative horizontal pulse is coupled in the input circuit of delay gate UV1 by coupling transformer 59 and timer circuit 18, it being apparent to parties skilled in the art that other forms of multivibrator circuits can be used to operate in response to the application of positive horizontal sync pulses.

As a practical matter, as shown hereinafter, an added gate, such as UV1, may be introduced between the timer circuit 18 and the gates UV1–UV last to provide a delay between the time of generation of the horizontal sync signal by the timer 18 and the initiation of the readout by delay circuits UV1–UV10. That is, in the use of conventional television circuitry, a blanking period of approximately twelve microseconds is normally provided immediately subsequent to the generation of each horizontal sync pulse, and an added delay circuit is introduced in such installations to provide a delay pulse of twelve microseconds duration, whereby the first gate UV1 will operate precisely at the time of initiation of the trace of each horizontal line. As a result, as each line trace is initiated on the raster of the display device 16, the horizontal sync pulse which is also coupled over a delay gate (not shown) and conductor 21 to the first delay circuit UV1 will initiate operation of the delay circuits in sequence, as shown in FIGURE 8, to successively apply a positive ten volt read out pulse to each readout circuit RCK1–RCK10 for the storage bins B1–B10.

As shown now in detail, with the coupling of the readout pulses successively to the readout circuits RCK1–RCK10 signals representative of the information on storage capacitors C1–C10 are coupled in succession by the signal derivation diodes D1–D10 to diodes D1′–D′ last (the diodes D1′ and D′ last in effect comprising a mixing circuit for the output signals), and over integrating circuit 47, to the clipper circuit 10 for conversion to video signals. As noted above, such read out of the signals of the storage capacitors C1–C10 occurs repeatedly at the horizontal rate (15,750 cycles per second) without noticeably disturbing the information which is stored on the capacitors C1–C last between radar scans.

Delay circuits UV1–UV10 which are operated in sequence responsive to receipt of each horizontal sync pulse over conductor 21 (15,750 cycles per second), may comprise any of a number of conventional one shot multivibrator circuits, or any other well known form of device for producing a chain of output pulses in sequence at the desired rate. One form of multivibrator which is operative in such arrangement is shown in the above identified copending application and in FIGURE 5 herein. As there shown, the delay generator UV comprises a twin triode tube 60, which may be of the type commercially available as a 12AU7, having anodes 61, 62, control grids 63, 64, cathodes 65, 66. Anode 61 of the first section is coupled over resistor 67 to 100 volt B+ supply, control grid 63 is coupled over resistor 63′ to ground, and cathode 65 is coupled over cathode resistor 72 to ground. Anode 62 of the second section of tube 60 is coupled over adjacent potentiometer 73 to 100 volt B+ supply, the adjustable lead of potentiometer 73 being connected over capacitor 30 to its associated readout circuit RCK1 and over capacitor 68′ to the input circuit for delay gate UV2. Capacitor 73′ is coupled across the portion of resistor 73 which is connected in the output circuit for delay circuit UV1. Control grid 64 is coupled over capacitors 75 and 71′ and the differentiating circuit including capacitor 68 and resistors 71′ to the horizontal sync output of timer circuit 18 (UV2–UV last are each connected over its capacitor 68 to the output conductor 69 in the preceding delay circuit in the chain), and also over a negative clipping circuit including diode 70 to ground. Control grid 64 is also connected over resistor 76 to cathode 66, which is in turn coupled with cathode 65 over resistor 72 to ground.

As the horizontal sync pulse is coupled to the input conductor of delay circuit UV1, the negative-going portion of the pulse is differentiated by capacitor 68, and resistor 71 to control the tube 60 to provide a square wave output pulse over capacitor 30 to the readout circuit RCK1 and to the input conductor for the delay circuit UV2. The diode 70 clips the positive pulses of the differentiated waveform.

Briefly, the second section of tube 60 in each delay gate UV1–UV10 is biased to be normally conductive. As a sync (or control) pulse is coupled to the input circuit for a delay gate, and over capacitor 68 and 71′ and 75 to the control grid 64 of the second section of tube 60 the sync pulse (the trailing edge of the input positive square wave pulse in the case of delay gates UV2–UV last) drives the second section of tube 60 nonconductive, and the increasing potential which appears in the anode circuit thereof is coupled over capacitor 68′ and 30 as the leading edge of a positive square wave.

As the negative sync pulse biases the grid 64 negative, cathode 66 (and also cathode 65) goes toward ground, and as cathode 65 becomes more negative than grid 63 the first section of tube 60 conducts. The potential in the anode circuit of tube 60 decreases and drives grid 64 more negative until full conductivity of the first section is reached. Capacitor 75 now discharges over resistor 76 and 72 to ground until the grid 64 becomes positive with respect to cathode 66 to effect conductivity of the second section.

The decreasing potential which appears in the anode circuit of the second section of tube 60 constitutes the trailing edge of the positive square wave pulse which is coupled over capacitor 30 to effect readout of the signal in the first bin of the storage device 5 and which is coupled over conductor 69 to the input circuit for the second delay UV2 to initiate the operation thereat. The components of the delay circuits were chosen to provide positive square wave pulses, in the present embodiment having a ten volt amplitude and a duration of 5.1 microseconds.

As noted above, and in FIGURE 7, the signal output of the radar system described herein varies over a scale of 0 minus 10 volts, which scale is compatible with the ten volt sampling signals provided by the delay gates UV1–UV last. It will be apparent to parties skilled in the art, however, that the novel converter is readily adaptable to provide signals of different values for use with radar systems having signal outputs of a different order.

As shown by curve K in FIGURE 7, the radar system at a first altitude relative to the terrain illustrated in FIGURE 1 provides a signal output during the vertical scan of the antenna which varies from —8 volts at —15 degrees to —1½ volts at +10 degrees. The signal output of the system for the aircraft at the same position relative to the terrain but at a lower altitude will result in the provision of a signal output such as shown in curve L.

It will be further apparent that if the terrain were flat, the signal output of the radar would plot as a curve which would be somewhat different in its shape. That is, if the terrain is flat the radar will not detect terrain during the initial portion of the vertical scan, and specifically until the antenna has been depressed to zero location (or below). Further, as the terrain is detected, the nature of the signal will be of a more negative order than the signal provided for terrain detected in FIGURE 1.

In that the principles of operation of the novel converter system are the same for the different terrain contours detected, it is only necessary to describe one exemplary set of data in detail. At this time, therefore, the disclosure sets forth the manner in which the representative signal output indicated by curve K for the terrain illustrated in FIGURE 1 is received, stored, read out and converted into video signals to provide the profile display of FIGURE 2.

Assuming, for example, that as the antenna 2 (FIGURE 4) is moved in its first sector of scan (at which time the wiper 26 of switch 6 engages contact W1) and that the video input level detected by the radar system 1 during such signal of the scan is five volts negative, it will be apparent that a five volt output signal of the radar set 1 will be coupled over wiper 26 and contact W1 to the capacitor C1 of the storage device 5 to charge the capacitor to minus five volts. In that the capacitor 30 connected to the output circuit of the first sampling or readout gate UV1 is coupled to conductor RC1 and over diode D1 to capacitor C1, and as a result of the finite back resistance of diode D1, the capacitor 30 is clamped to minus five volts with respect to ground (the positive side of capacitor C1 being at ground potential).

With the coupling of a horizontal sync pulse to the first gate UV1 to initiate the operation of the gates UV1–UV10 in sequence, a positive ten volt pulse in generated and coupled to capacitor 30 by the delay circuit UV1. Capacitor 30 is now negatively charged due to the voltage on C1 and diode D1' is back biased until the magnitued of the pulse equals ground potential. In that it was assumed that the video input level was five volts negative, it will be apparent that the output voltage will be equal to plus ten volts minus five volts or a plus five volts.

Stated in another manner, the signal which is coupled from a storage bin, such as B1, over readout conductor RC1 and diode D1', is always equal to ten volts minus the value of the level or amplitude of the video signal which was coupled to the storage bin. Thus, when the input signal to a bin is minus ten volts, the readout signal coupled over its associated diode in the mixer circuit is zero, and when the input signal to a bin is zero volts, then the readout signal coupled over the associated one of the diodes D1'–D' last will be positive ten volts.

The transfer function of the readout circuit is obviously quite linear. Further a large number of readout pulses (several hundred thousand) do not noticeably disturb the signals which are stored on the storage bins, and as a result continuous readings of the information stored on the bins may be made between each cycle of the radar antenna. Additionally it is clear that the voltage level on the storage bins can vary with rapidly varying inputs to permit the radar display converter to follow the most abrupt changes in the terrain profile.

The signal output of the diodes D1'–D' last which comprises a composite waveform comprised of the successive signal bits read from the storage bins B1–B10 in succession by the delay gates UV1–UV10 in response to each horizontal sync start signal, is coupled over an integrating circiut 47 comprised of resistor 48 and capacitor 49 to a clipper circuit 10. A vertical saw-tooth generator circuit 9 which operates at the vertical rate of the raster and is controlled by the vertical sync pulses of timer circuit 18, couples a linear sawtooth voltage over conductor 51 to clipper circuit 10 at the vertical raster rate for mixing with the output signals of the diodes D1'–D' last which occur at the horizontal rate. The resultant composite signal is applied to the clipper circuit 10 which clips the signals at ground level to remove the negative portions of the signal.

The D.C. voltage levels of the vertical sawtooth output of generator 9 and the video pulses output of the diodes D1'–D' last are adjusted so that if the stored signal level in each of the storage bins is zero, a positive ten volt signal will appear at the ouput of the diodes D1'–D' last continuously during the first horizontal trace. If the output level from the diodes D1'–D' last during a horizontal trace is plus ten volts, the combined signal output of clipper circuit 10 will be a pulse as wide as a single horizontal sweep which will produce a bright horizontal line at the top of the display screen. Since such information would then be read into the clipper on each horizontal sweep, the bright video trace would persist for the duration of the entire raster trace, and the entire screen of the display unit would present a bright white light output. It is apparent, of course, that the signal input of the radar system 1 to the storage device 5 will vary in accordance with the nature of the ground terrain in the path of the aircraft, and such display would not occur in an operating installation unless the pilot were in trouble.

The mixing of the vertical sweep voltage and the pulses followed by the clipping action of the clipper circuit 10 produces a series of video pulses, the width of each video pulse being a function of the amplitude modulation provided by the storage units. The video pulses as amplified and coupled to the electron gun of the cathode ray tube will provide a white shape on the screen, the upper edge of which corresponds to the variation in the elevation of the terrain at the different ranges in the path of the aircraft. The manner of conversion of the high frequency signals read out of the storage capacitors to video signals which display the terrain profile represented by the stored signals is now set forth.

Figure 6:
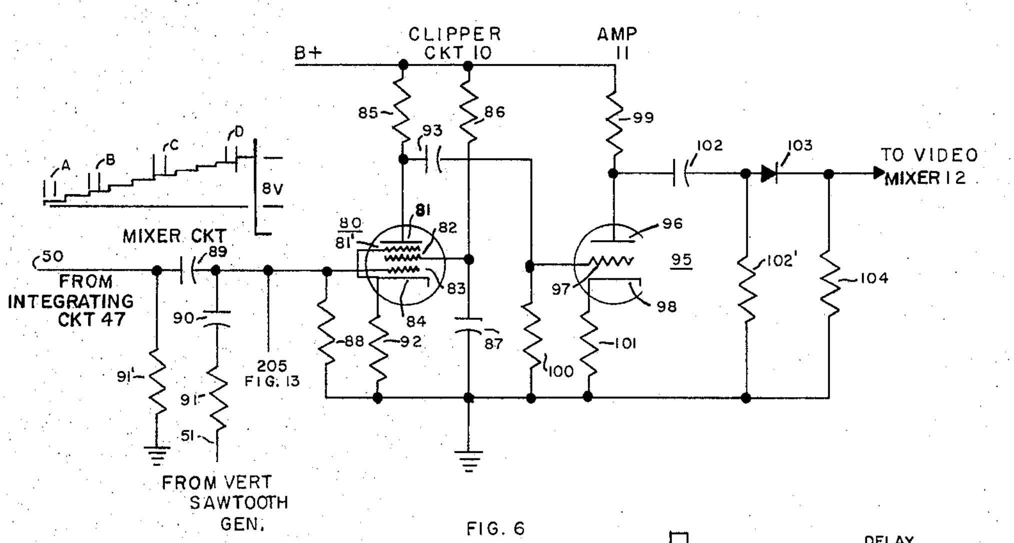

A clipping circuit 10 for accomplishing the conversion of the stored signals to video pulses is set forth in the above identified copending application, and in FIGURE 6 of the present disclosure. As shown in FIGURE 6, clipper circuit 10 may comprise a pentode tube 80 (which may be of the type commercially available as a 6BN6) including anode 81, suppressor 81', screen 82, control grid 83, cathode 84. The anode 81 may be coupled over resistor 85 to B+ power supply; screen grid 82 is coupled over resistor 86 to B+ and over capacitor 87 to ground; control grid 83 is coupled over grid resistor 88 to ground, and over conductor 50, capacitor 89 and integrating circuit 47 to the output of diodes D1'–D' last, and over series-connected capacitor-resistor 90, 91 and conductor 51 to the vertical sawtooth generator 9; and cathode 84 is coupled over cathode resistor 92 to ground. Anode 81 is also coupled over capacitor 93 to the input circuit of the amplifier stage 11. Suppressor grid 81' is coupled to cathode 84.

The composite waveform output of the diodes D1'–D' last (which comprises the successive output signals which have been derived from the bins B1–B last, and which has a shape which is the same as the profile of the terrain—see for example the waveform adjacent input terminal 50 in FIGURE 6—) is coupled over capacitor 89 to the control grid 83 of mixer tube 80 once each horizontal line scan. The vertical sawtooth output of the sawtooth generator 9 is generated at the frequency of one sawtooth waveform per frame. Mixer tube 80 is biased so that the tube will not operate responsive to the application of the sawtooth generator of the control grid 83 alone. As further indicated above, the tube is biased so that when the input level video signal is plus ten volts such pulse plus the amplitude of the sawtooth generator is sufficient during the trace of the first line to effect conductivity of the tube. However, no value less than the ten volts will effect conductivity of a tube during the first horizontal line trace. With successive traces of the line, the amplitude of the vertical sawtooth wave increases, and it is apparent that the tube will conduct with the coupling of signals of a successively lower value thereto as the successive traces of the line occur (FIGURES 9A–9D).

The output of the clipping circuit 10 is coupled to the amplifier stage 11 for amplification. Amplifier 11 may be of the conventional type and may include one section of a triode tube 95 such as a triode which is commercially available as a 12AU7 and which includes an anode 96 connected over resistor 99 to the B+ supply, and also over capacitor 102 to the clipper circuit including diode 103 and resistor 104; a control grid 97 connected to the output circuit of the first section of tube 80 and over resistor 100 to ground; and a cathode 98 connected over resistor 101 to ground.

The output signals of the mixer circuit 80 are amplified by tube 95 in the conventional manner and are coupled over the capacitor 102 to the clipper circuit including the clipping diode 103, resistor 102' and resistor 104 to the video amplifier 12 for mixing with the other signals which are coupled to the electron gun of the cathode ray tube.

*Display generation*

The manner of operation of the system to provide a terrain profile display, such as shown in FIGURE 2, to represent the portion of the terrain of FIGURE 1 which is in the line of flight of the aircraft, will now be described in detail. Specific signal value radar outputs are assumed for purposes of the explanation, specific values being used for the signals generated at points A–D in the radar scan and being indicated by the exemplary curve K of FIGURE 7.

*Signal pickup*

For purposes of example, it is assumed in the present embodiment that the radar antenna scan (which may be pitch stabilized) is initiated at an angle of −15 degrees and moves upwardly to +10 degrees and returns to its initial position in 1.5 seconds.

With specific reference to FIGURES 1 and 2, it will be apparent that in the perspective showing the angles of scan relative to the assumed aircraft position (to the left of the illustrations) are shown diagrammatically to permit a more clear disclosure of the point A–D in the figures: As illustrated by the values, as the radar antenna initiates its scan (−15 degrees), terrain will be detected at 1000 yards (point A), and with reference to the exemplary curve of FIGURE 7, the signal output of the radar with the detection of terrain at 1000 yards at −15 degrees of scan will be −8 volts (point A). With operation of the radar to −10 degrees and the detection of the terrain at 3000 yards, the radar provides a signal in the order of −5 volts (point B—FIGURES 1, 2 and 7); with the operation of the antenna to −2 degrees and the detection of the terrain at 6000 yards, the radar will provide a signal in the order of −2½ volts (point C—FIGURES 1, 2 and 7); and with the operation of the antenna in its scan to +10 degrees and the detection of terrain at 9000 yards the radar will provide a signal of −1½ volts. (Point D.)

*Storage of radar signals*

As indicated above, the signals which are provided by the radar set are commutated by switch 6 and coupled to the bins in the storage device 5, the switch being operated in synchronism across contacts W1–W10 with the movement of the antenna through its 25 degree scan to effect the registration of the radar signals representative of the detected terrain contour on the different bins in the storage device. Thus, assuming that the switch was at contacts W1, W3, W6 and W9 as signals A–D respectively are received, it will be apparent that capacitor C1 will be charged to −8 volts, capacitor C3 will be charged to −5 volts, capacitor C6 will be charged to −2½ volts and capacitor C9 will be charged to −1½ volts. Each of the other capacitors in the storage device will be charged in a similar manner to a value which is related to the contour of the terrain detected at the time the commutator switch is connected thereto.

*Readout of signals*

The delay circuits UV1–UV10 in the readout circuit 7 are operative at the rate of the horizontal scan to effect readout of the signals stored on the bins of the storage device 5, the readout signals being coupled over the integrating circuit 47, clipper circuit 10, amplifier circuit 11 and video mixer 12 to the electron gun of the display device 16 at the horizontal rate.

The readout signal coupled over each readout conductor RC1–RC10 is equal to the value of the readout pulse (10 volts) minus the value of the signal stored on the bin connected to the readout conductor. Thus the output signal on conductor RC1 is 2 volts (10—8 volts); the output signal on RC3 will be 5 volts (10—5 volts); the output signal on conductor RC6 will be 7½ volts (10—2½ volts); and the output signal on conductor RC9 will be 8½ volts (10—1½ volts).

The readout signals having such value are coupled to the readout conductors once in each horizontal line scan, each signal being coupled thereto during the increment in the horizontal line scan which is related to the position of the readout circuit in the chain. Assuming that the system includes ten delay circuits UV1–UV10, each delay circuit operates for a duration of approximately 1/10 of the horizontal line scan. As a result the signal on the first bin B1 (capacitor C1) of the storage device (−8 volts) is sampled during the first increment of each horizontal line scan by its readout circuit including capacitor 30 and diode D1' and a two volt signal is coupled to the clipper circuit 10 during the first segment of each horizontal line scan. In a similar manner a 5 volt signal is coupled over diode D3' to clipper circuit 10 during the third increment of each horizontal line scan, a 7½ volt signal is coupled over diode D7' during the sixth increment of each horizontal line scan, and an 8½ volt signal is coupled over diode D9' to clipper circuit 10 during the ninth increment of each horizontal line scan. The signals provided during each of the other segments of each line scan will be apparent from its foregoing disclosure and reference to the curve K in FIGURE 7.

The ten output signals thus coupled to the clipper circuit 10 (FIGURE 6) in sequence during each horizontal line scan provide a composite waveform having the profile of the terrain which was scanned, the shape of such waveform and the incremental portion being shown adjacent the input circuit to clipper circuit 10.

Figure 9A:
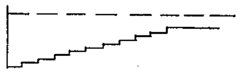
Figure 9C:
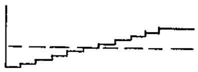
Figure 9B:
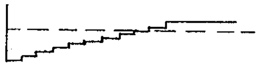

The composite signal which is coupled to the clipper circuit at the horizontal trace rate (15,750 c.p.s.) and the vertical sawtooth wave which occurs at the rate of the vertical scan of the raster are coupled to tube 80. However, as indicated above, the clipper tube 80 is biased to conduct during the trace of the first line of the raster only during the period that a ten volt pulse is received. The value of the signal increments of the exemplary composite waveform will therefore be insufficient during the first line of the raster trace to exceed the bias level established at the grid and cathode 83, 84 of the tube 80 in clipper circuit 10 (FIGURE 9A). As the raster progresses the value of the vertical sawtooth wave increases, and as the raster advances to the horizontal line in the trace which intersects point D (FIGURE 2), the output signal provided over readout conductor RC9 from bin 9 (8½ volts) is, with the value of the vertical sawtooth during such line trace, sufficient to drive clipper tube 80 into conduction (FIGURE 9B). Tube 80 conducts for the period that segment 9 (and 10 as shown in FIGURE 6) is coupled thereto during such line trace and during each succeeding trace of the raster. During the period of conduction, the resultant signal is coupled over amplifier circuit 11, video amplifier 12 to display circuit 16 to provide a white trace for the corresponding segment of the line trace, and each corresponding segment of the remaining line traces in the raster.

Figure 9D:
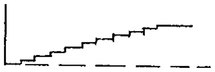

As the trace progresses down the screen, the signals on bins C9, C8, C7 are sufficient at successive different line traces to provide a video signal which results in a white line on a raster during its segment of each horizontal line trace. As the raster progresses to the line which intersects point C (FIG. 2), the level of the composite waveform beginning with segment 6 will be sufficient with the vertical sawtooth at such point in the raster trace to exceed the bias level of the clipper circuit 10 (FIG. 9C). Since the signals on C10–C7 were sufficient to provide a video signal over the associated circuitry to the display tube during earlier line traces, a white trace from point C to the right hand margin of the display is provided during the identified line trace and each succeeding line trace in the raster. The manner in which the remaining portions of the waveform effect the provision of the illustrated display including the portions between points C–B and B–A will be apparent therefrom. As shown in FIGURE 9D each of the stored signals as mixed with the vertical sawtooth wave is sufficient to effect a white trace during its segment of each line traced on the lower portion of the raster.

The aircraft line, as noted above, remain fixed. In the event that the aircraft were at a lower altitude than that represented in FIGURES 1, 2 and 7 (curve K) the same terrain would be represented by signals of a more positive value as shown in curve L, FIGURE 7, and the resultant profile displayed on the screen would be above or higher than the illustrated display. In a similar manner, if the aircraft were at a higher altitude the signal curve would be of a more negative value, and the profile would appear on a lower section of the display screen. In the event that terrain is not detected in the upper or latter sector of the radar scan (during +8 to +10 degrees portion, for example), no signal would be coupled to capacitor C10, and the last or tenth vertical segment provided in each line display would be dark.

The foregoing signal values which have been used in the illustration were chosen for exemplary purposes, and it will be apparent that various and different values may be provided to represent different types of terrain conditions without departing from the scope of the invention.

*Range lines*

The range lines of the terrain profile display which appear as bright vertical bars (see FIGURE 2) to provide range markers on the display relative to the profile, are generated by a range line circuit 15 which derives sync pulses from the delay circuits, UV1–UV10, in the readout circuit 7.

With reference to FIGURE 10, it will be apparent that each range line to be generated is represented by a capacitor 110 which is connected to the output circuit of a different one of the sampling or delay circuits UV1–UV10. The first range line generator, for example, is connected to the output circuit of delay circuit UV1, and the trailing edge of the square wave output pulse of delay circuit UV1 is transmitted thereto at the same time in each horizontal line trace. The pulse thus coupled to the first range line circuit is differentiated by capacitor 110 and resistor 113, the negative-going portion of the differentiated waveform being fed over diode 112 and resistor 114 to a conventional transistor amplifier stage 27 for coupling over the video mixer circuit 12 and the video amplifier 16' to the input circuit for the electron beam gun of the display tube 16. Variation of the amplification factor of amplifier 27 permits adjustment of the brightness of the range lines, and adjustable resistance means (not shown) are connected in the emitter circuit of the amplifier stage 27 for such purpose. The width of the range line may be changed by varying the values of the differentiating circuit in the range line circuit.

It is apparent that if four range line circuits such as illustrated in FIGURE 10 are connected to the delay circuits 1, 3, 6, 9 (FIG. 4) the pulses which are extended over such circuits occur at the same instant in each horizontal line trace of the raster, and four spaced vertical range lines will be displayed on the display device as shown in FIG. 2. Variation of the spacing between the range lines may be effected by connecting the range line circuits to different ones of the delay circuits UV1–UV last, or alternatively introducing adjustable delay circuitry in the range circuit.

*Constant altitude line*

A constant altitude reference line is provided on the display by a constant altitude line circuit 14, the reference line appearing on the display as a bright horizontal line which may be preset at any desired level by the pilot of the aircraft or the operator of the simulator device. Generation of the constant altitude line is basically accomplished by a diode pick-off circuit having a first and second input circuit to which are respectively coupled a vertical sawtooth signal and a direct current voltage which is proportional to the desired altitude (or the desired location of the constant altitude line).

With reference to FIGURE 10, constant altitude line circuit 14 comprises a first input circuit including line positioner voltage divider 120 and a second input circuit including conductor 28 which is connected to the output of the vertical sawtooth generator 9, and a parallel-connected capacitor 121, and resistor 122. A pair of diodes 123, 124 connected back to back to the first and second input circuits are further connected over a differentiating circuit consisting of capacitor 125 and resistance 126 to a three stage amplifier circuit 127 and over the video mixer circuit 12 and video amplifier 16' to the display unit 16.

In operation, as long as the sum of (a) the direct current level line-position voltage provided over the voltage divider 120 in the first input circuit, and (b) the vertical sawtooth signal provided over conductor 28 by the vertical sawtooth generator 9, are negative, the diode 123 will be signal output of each of the rectifier circuits 150, and readout means for converting the signals to the high frequency rate of a cathode ray tube raster including a plurality of delay gates 180, a plurality of terrain clipper circuits 190, a vertical sawtooth generator 9, and video mixer means 12 for coupling the signal output of the terrain clipper 190 over the video amplifier 16' to the display tube 16. Control circuitry for the display tube, as before, includes a timing circuit 18 and deflection circuit 17. A horizon line generator 201 provides a horizon line on the display which is related in position to the pitch of the aircraft.

More specifically, the radar unit 135 employed in the system is of the type which provides (a) a low voltage video signal over terminal 137 at 2400 pps. which is proportional to the height of the terrain being scanned as a function of range; (b) a 2400 pps. signal over terminal 138; and (c) servo signals from the antenna drive AD which continually indicate the azimuth angle of the antenna 136. In operation the radar antenna 136 scans the terrain profile in both azimuth and range, the radar return echoes being functions of the terrain elevation, antenna depression angle and azimuth.

Assuming, for purposes of example, that the radar antenna is at one extreme heading of its azimuth pattern, the antenna beam is electronically scanned at the rate of 2400 pps. from the foreground to the horizon at such azimuth heading. As the antenna is being mechanically swept horizontally through its azimuth pattern at a one cycle per second rate, the vertical electronic scan is continually repeated as an azimuth sector of approximately 60 degrees of azimuth is scanned. The radar signals obtained in such manner represent a series of elevation sweeps which provide signals representative of the profiles or "slices" at the various azimuth headings and are coupled to the converter over terminal 138.

The incoming radar signals which represent the terrain height vs. range during each vertical displacement of the beam are coupled over an emitter follower input circuit 139 and a common conductor 250 to the input circuits for a group of $n$ rectifier circuits 150 ($n=10$ in the present embodiment). A plurality of $n$ cascaded range gates 140 operate successively during each vertical sweep of the antenna 136 to divide the incoming radar signals which are received over the input circuit 139 during each vertical sweep of the radar antenna into $n$ successive segments by passing the signals into a different one of the rectifier circuits 150 during each different segment.

A plurality of $n$ switches 160 are connected to be operated over $p$ contacts ($p=10$ in the present embodiment) in synchronism with each other, and in synchronism with the lateral or azimuth sweep of the antenna 136. The output of each rectifier circuit is connected to the input circuit for a different one of the commutator switches 160, and as the switches 160 are driven in synchronism with the movement of the antenna in its lateral sweep, the output of each rectifier circuit of group 150 is divided into $p$ segments.

The $p$ contacts of each switch 160 are connected to the bins of one of a plurality of storage devices 170, different switches being connected to different storage devices. Each storage device includes $p$ bins, whereby each contact position on a switch is connected to an individual bin in its associated storage device. Each bin in the present embodiment comprises a capacitor, although other forms of signal storage devices may also be used. Time constants of the storage bins are such as to preclude the possibility of degradation of the stored signal during the required storage and readout period.

As will be shown hereinafter, in each azimuth sweep of the antenna 136 a signal is stored on each bin which represents the maximum terrain height in a given range channel in a given azimuth segment of the antenna scan. Stated in another manner, each bin in a storage device stores signals representative of the terrain height at one given range in one azimuth sector.

Manifestly if the information stored on the first bin in each storage device were examined, the combined information of all of the first bins in the storage devices would provide a representation of the profile of the terrain at the different ranges in the first azimuth. In a similar manner, examination of the information in each of the second bins of each storage device would provide a representation of the profile at the second azimuth, etc.

A novel readout circuit provided in the converter effects readout of such information in a given sequence and at a rate which provides signals which, as coupled to the electron gun of a cathode ray tube, reproduce the profiles of the terrain at the different ranges as stored on the storage devices 170.

The readout circuit includes a plurality of $p$ delay gates DG1–DG10 each of which is connected to "read-out" the information for a different profile, the readout lead for the first delay gate being connected to the first bin of each one of the storage devices, the readout lead for the second delay gate being connected to the second bin of each storage device, etc. The delay gates 180 are synchronized in operation with the horizontal rate of the raster trace of the display tube, the delay gates being operated in cascade (or sequence) responsive to the coupling of each horizontal synch pulse to the first delay gate of the group.

The novel readout circuit in converting the low speed write-in signals of the radar to the high speed readout requirements of the raster scan in the display device basically effects readout of the bins (capacitors) in each storage device by applying a constant amplitude pulse over a capacitor and a biased diode to each of the bins in succession, the readout of the entire group of storage devices being completed in the time duration of a horizontal line trace of the raster.

In order to display the waveform as a profile line on the display device, the readout signals which represent the profile line are coupled over a diode to terrain clipper circuit 190 for mixing with a sawtooth wave which has a frequency of the vertical trace rate of the display unit. The signals as mixed in a terrain clipper circuit are then coupled over a clipping circuit which passes the more positive portions of the waveform first, and then progresses at the vertical rate to the lower portions of the waveform. After amplification, the outputs of each of the clipper circuits in group 190 are coupled over a common input circuit to the video mixer 12 and video amplifier 16' for coupling to the electron gun of the display device 16.

Different degrees of brightness for each of the terrain profiles are obtained by means of voltage divider circuits 381–390 which are connected in the output of each of the terrain clippers, whereby the amplitude of the signal fed to the video mixer 12 by each clipper can be adjusted to a different intensity, and specifically to effect the display of the further ranges in a dark gray tone, and the closer range as a bright white. The resultant signals are coupled over diodes which only allow the most positive signals to pass thereover, so that closer obstacles are prevented from being transparent on the display.

The control circuitry for the display or monitor device 16 is similar to that set forth in FIGURE 4 and includes the timing circuit 18 and deflection circuit 17.

An artificial horizon line 6 is generated by a horizon generator circuit 201, and coupled to the terrain clearance video mixer 12 to provide a warning for the pilot that the aircraft is approaching the terrain above the flight line of the aircraft. The terrain changes to a whiter shade above the horizon line to provide adequate warning for the pilot. The horizon line and the generated video signal which move in response to a direct current signal from an aircraft pitch sensor, and roll is reprenonconducting and the voltage at point A will be approximately 0.5 volts negative, which is the "turn-on" voltage of one form of commercially available silicon diode. However, as the applied voltage approaches zero, the turn off voltage for diode 123 is reached, and a portion of the vertical sweep signal will appear at point A. As the applied voltage rises above zero and the turn-on voltage of diode 124 (approximately plus 0.5 volt) is reached, the voltage at point A will level off at the turn-on voltage of diode 124.

The small section of the vertical sweep signal which occurs during that period is capacitively coupled to the differentiating circuit consisting of capacitor 125 and a resistor 126. Such signal comprises a timing waveform for the constant altitude line since its deviation from the vertical center line of the display is directly proportional to the level of the D.C. voltage applied over voltage divider 120 for the constant altitude line circuit 14.

The output pulse as differentiated by capacitor 125 and resistor 126 is coupled to amplifier 127 which is adjusted to be driven to saturation by the pulse to thereby provide a rectangular shaped waveform for coupling to the video mixer 12. In one commercial embodiment, amplifier 127 comprised a three stage transistor amplifier of conventional design.

*Aircraft altitude line*

The aicraft altitude line circuitry 13 for generating the aircraft altitude line is the same as the circuitry for the constant altitude line circuit 14 with the exception that the time constants of resistor 126 and capacitor 125 are chosen to generate a line having half the width as that of the constant altitude line to prevent confusion between the two as presented on the display.

*Video mixer*

The video mixer 12 is connected to couple the output signals of the (a) clipper-amplifier circuits 10, 11, (b) constant aircraft line circuit 13, (c) constant altitude line circuit 14 and (d) range line circuit 15 to the video amplifier 16' for the monitor 16. Video mixer 12 as shown in FIGURE 10 basically comprises a diode 130, resistor 131 and a pair of series diodes 132, 133, the diode 130 being connected "back-to-back" with diodes 132, 133 to limit the maximum video signal output to approximately one volt in order to prevent saturation of the video amplifier.

*Summary description of terrain profile generator*

As an aid to the description of the specific structure of the novel profile generator the following detailed listing of component parts and values is included herewith.

Delay circuits UV1–UV10:
- Capacitor 68, 400 μμf.
- Rectifier 70, 1n26
- Resistor 67, 4.7K
- Resistor 71, 10K
- Resistor 72, 4.7K
- Resistor 73, 4.7K
- Capacitor 30, .05 μf.
- Resistor 76, 50K
- Capacitor 75, 100 μμf.
- Tube 60, 12AU7
- Resistor 63', 10K
- Capacitor 71', 470 μμf.
- Capacitor 73', 470 μμf.
- Diode 70, 1N626

Readout circuit:
- Capacitor 30, .05 μf.
- Diode D1, 1N457
- Diode D1, 1N626

Clipper amplifier circuit 10:
- Resistor 91, 68K
- Resistor 88, 110K
- Resistor 85, 4.7K
- Resistor 92, 390 ohms
- Resistor 86, 8.2K
- Resistor 99, 6.8K
- Resistor 100, 1 mg.
- Resistor 101, 470 ohms
- Resistor 104, 1K
- Capacitor 87, .1 μf
- Capacitor 89, .001 μf.
- Capacitor 90, 2 μf.
- Capacitor 93, .002 μf.
- Capacitor 102, .1 μf.
- Diode 103, 1Nb26

Storage device 5:
- Capacitor C1–C10, 100 μf./15V.

Constant altitude circuit 14:
- Potential 120, 10K
- Resistor 120', 47K
- Resistor 122, 47K
- Resistor 126, 15K
- Capacitor 121, .047 μf.
- Capacitor 125, .068 μf.
- Diodes 123, 1N457
- Diodes 124, 1N457

Integrating circuit:
- Resistor 48, 1K
- Capacitor 49, 470 μμf.

Aircraft line circuit 13:
- Potentiometer 120a, 10I
- Resistor 120'a, 47K
- Resistor 122a, 47K
- Resistor 126a, 15K
- Capacitor 121a, .047 μf
- Capacitor 125a, .068 μf
- Diode 123, 1N457
- Diode 124, 1N457

Range line circuit 15:
- Capacitor 110, 22 μμf.
- Diode 112, DR321
- Resistor 113, 8.2K
- Resistor 114, 100K Video mixer 12:
- Diode 130, 1N626
- Diode 132, 1N457
- Diode 133, 1N457
- Resistor 131, 1K As shown hereinafter the delay circuit and clipper stage may also be transistorized, the details of such circuits being set forth in the description relating to the novel terrain clearance generator which now follows.

TERRAIN CLEARANCE DISPLAY

*Brief description of display*

The novel structure and concepts used in the radar display converter for providing a profile of the terrain on the display device are also useful in producing a display of the terrain with the same contours as are viewed by the pilot through the aircraft windshield. In such arrangement, the radar device senses a profile of the terrain in each of a series of successive azimuth sectors (or "slices" at different azimuths), and the display presents a number of transverse terrain profile lines, each of which represents a range.

A typical terrain clearance display which is provided by the novel converter system is shown in FIGURE 21. As there shown, each of the terrain profile lines provides a plot of height of terrain vs. radar antenna azimuth angle, and is plotted for a given range channel ahead of the aircraft (0–0.5 miles; 0.5–1.0 miles; 1.0–1.5 miles, etc.). The normal positions of the profile lines on the display tube are chosen to give a representation of perspective that best utilizes the space in the lower half of the cathode ray tube. The 0–0.5 mile profile line appears near the bottom edge of the tube, and succeeding range channels are spaced at desired intervals in perspective up to the horizon. The terrain heights appearing along each profile line are also scaled to give proper distance perspective. Whenever one range profile is at a closer range and of a greater height than the terrain in back of the closer terrain, the converter is operative to present the closer terrain in such manner as to blank out the terrain which is there behind.

The display also includes a terrain clearance line (also used as a horizon line) that appears as a horizontal plane extending in front of the aircraft. Intersection of this line by the terrain indicates that the terrain is at an elevation greater than that of the aircraft. The absence of such intersection indicates clearance between the aircraft and the terrain. The horizon line which is always visible regardless of the background shape, accommodates aircraft roll and pitch angles through 360 degrees, and serves as the functioning point for all range perspective in that it is representative of the horizon line.

*Brief description of structure*

The converter system as used in the generation of signals which provide a terrain clearance type display is shown in FIGURES 12–16.

With reference to FIGURES 12, 13, 14, 15 and 16 the novel converter circuit for providing a terrain clearance display basically comprises radar system 135, an input circuit 139, a plurality of rectifier circuits 150 connected to the input circuit 139, a plurality of range gates 140 for enabling the rectifier circuits 150 in sequence and in synchronism with each vertical scan of the radar system 135, a plurality of switches 160 connected to divide the output signals of each rectifier into $n$ segments ($n=10$ herein) at the azimuth rate of motion of the radar antenna, a plurality of storage devices 170 for storing the sented by rotating the deflection yoke on the display tube.

*Specific description*

A. *Signal detection and storage.*—As noted above, the radar system 135 in the present arrangement is operative to scan the terrain profile and azimuth heading from the foreground to the horizon at 2400 pps., and the radar return echoes received are therefore functions of the terrain elevation at the different antenna depression angles for a particular azimuth. The antenna unit is also mechanically rotated horizontally at a one cycle per second rate through a sector scan of approximately 60 degrees of azimuth. The vertical scan of the antenna beam, which is normally between +10 degrees and −50 degrees for each azimuth segment, provides signals at the rate of 2400 cycles per second for coupling over a radar signal coupling or input circuit 139 to conductor 250 which is connected common to the input circuits for each of the rectifier circuits R1–R10.

Figure 13:
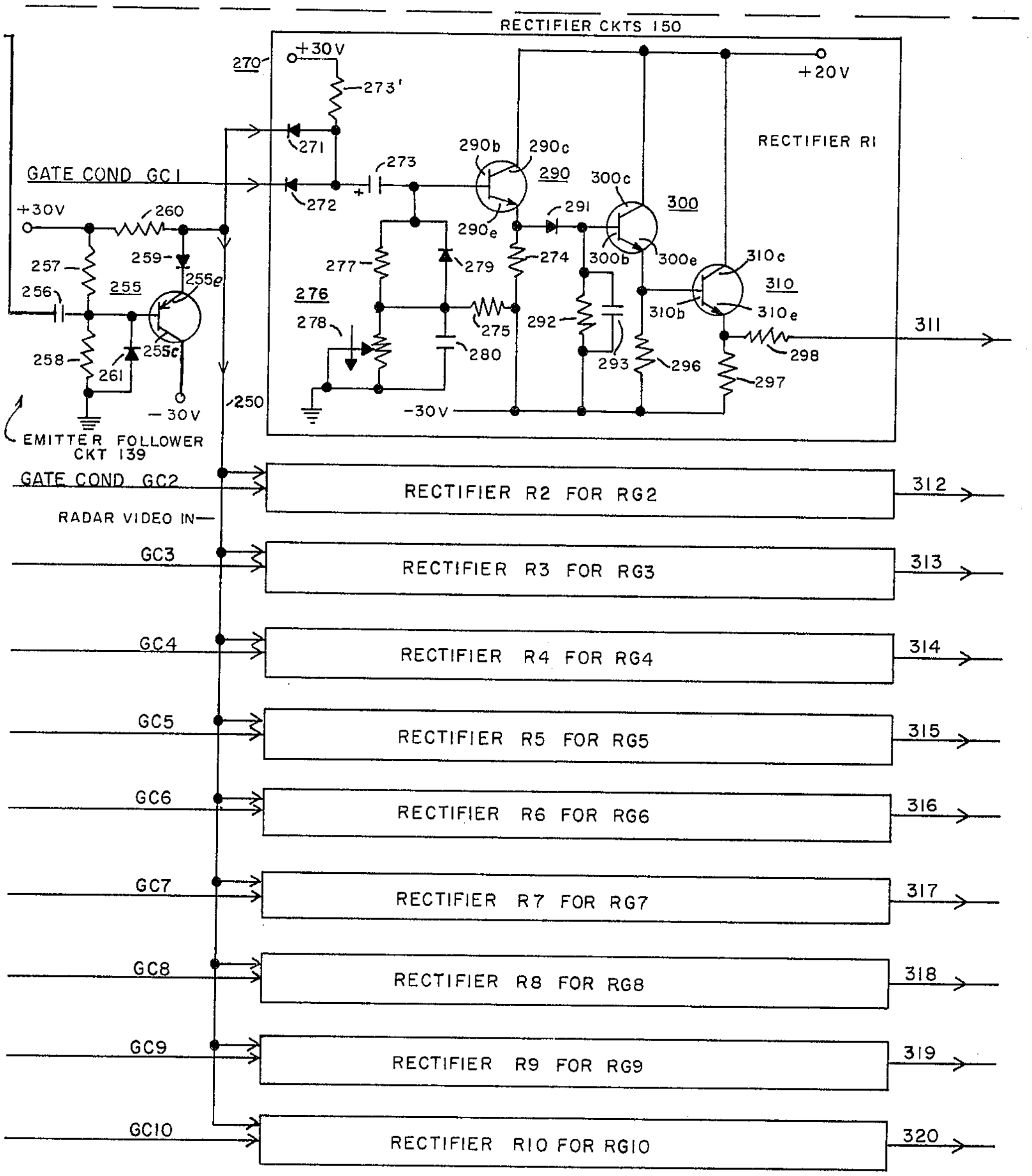

The radar signal coupling or input circuit 139 basically comprises a semiconductor device connected at an emitter follower to couple the incoming radar video signals received from the radar system over video input terminal 137 to the common input circuit 250 for rectifiers R1–R10. As shown in FIGURE 13, the input circuit 139 incldues transistor 255 having a collector element **255*c* connected to negative 30-volt battery, a base element 255*b* connected over coupling capactior 256 and a voltage divider including resistors 257 and 258, to the radar video input terminal 137, and an emitter 255*e*, connected over diode 259 and resistor 260 to positive 30 volt source, the output conductor 250 for the emitter follower stage being connected between diode 259 and resistance 260. Diode 261 is connected between the base 255*b*** and ground to clamp the negative portion of the incoming radar signals to ground.

The emitter follower operates in the manner of a conventional impedance coupling device, and couples the signals incoming from the radar during each vertical sweep to the common conductor 250 for selective division into ten segments or ranges by the range gates 140 and the rectifier circuits R1–R10. The range gates RG1–RG10 are connected in a cascade arrangement whereby with the coupling of an operating signal to the first range gate, each gate in succession operates to provide a square wave pulse which is coupled to its associated rectifier circuit. The first range gate is connected to the sync terminal 138 of the radar set 135, and a sync signal is coupled thereover at the start of each vertical sweep by the radar system.

Figure 5:
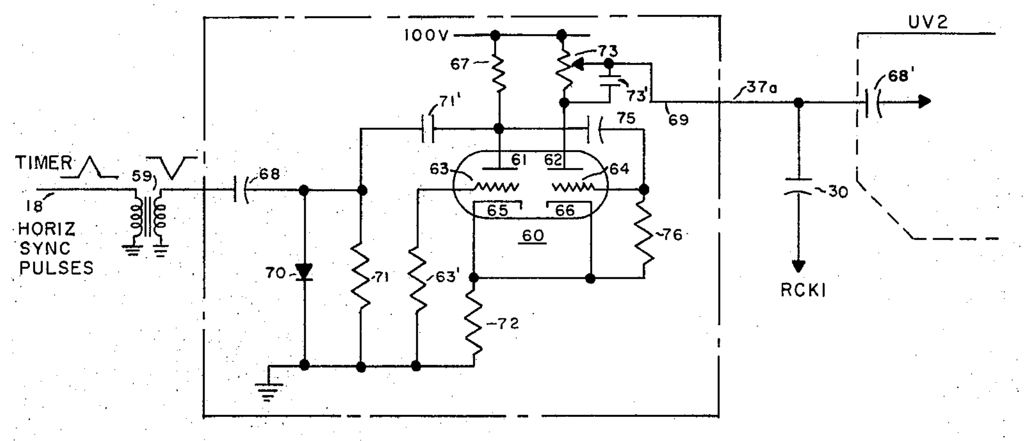

The range gates are one shot multivibrators, which may be similar in construction to the multivibrator circuits used in the terrain profile generator system UV1–UV last (FIGURES 4 and 5). In the disclosed embodiment, successive ones of the range gates have different time constants to thereby provide different gating widths for the rectifier circuits which are connected thereto. The end effect of the varying range gate pulse widths is to permit the range slices to diminish in width as the range increases. Manifestly, the sum of the gate widths will equal the time duration of the radar elevational or vertical sweep. If desired, the range gates may have equal gating widths, whereby the range slices remain constant as the range changes.

The range gate time constants in one specific embodiment wherein pulses of ten volts amplitude were coupled by each of the range gates to the rectifier circuits connected thereto were in the order shown in the following chart:

| | μs |
|---|---|
| Range gate 1 | 87 |
| Range gate 2 | 69 |
| Range gate 3 | 54 |
| Range gate 4 | 43 |
| Range gate 5 | 35 |
| Range gate 6 | 28 |
| Range gate 7 | 22 |
| Range gate 8 | 18 |
| Range gate 9 | 15 |
| Range gate 10 | 11 |
| Total | 382 |

The sum of the gate widths equals the time period for each vertical electronic scan. Assuming that the radar antenna is in the first sector of the azimuth sweep and is fed a vertical sweep electronically at the rate of 2400 p.p.s., the range gates RG1–RG last will effectively divide the incoming radar video signal into time durations indicated on the chart by operating in the sequence indicated for the time duration specified, and thereby successively gating the radar video signal to rectifiers R1–R last to couple the corresponding segments of the radar signal to the commutator switches 160.

As noted above, the circuitry of the range gates RG1–RG last may comprise the multivibrator circuit of FIGURE 5, it being only necessary to adjust the timing constants of the successive range gates to different time periods in the manner indicated in the time chart included hereinabove. In certain applications of the converter devices, however, it is desirable to provide a transistorized version wherein the component parts basically comprise transistors and other solid state devices mounted on printed circuit boards. Such arrangement results in a system which is less subject to shock and requires a reduced amount of mounting space. The reduction of space requirements for the equipment is, of course, an advantage in many types of aircraft installations.

Figure 12:
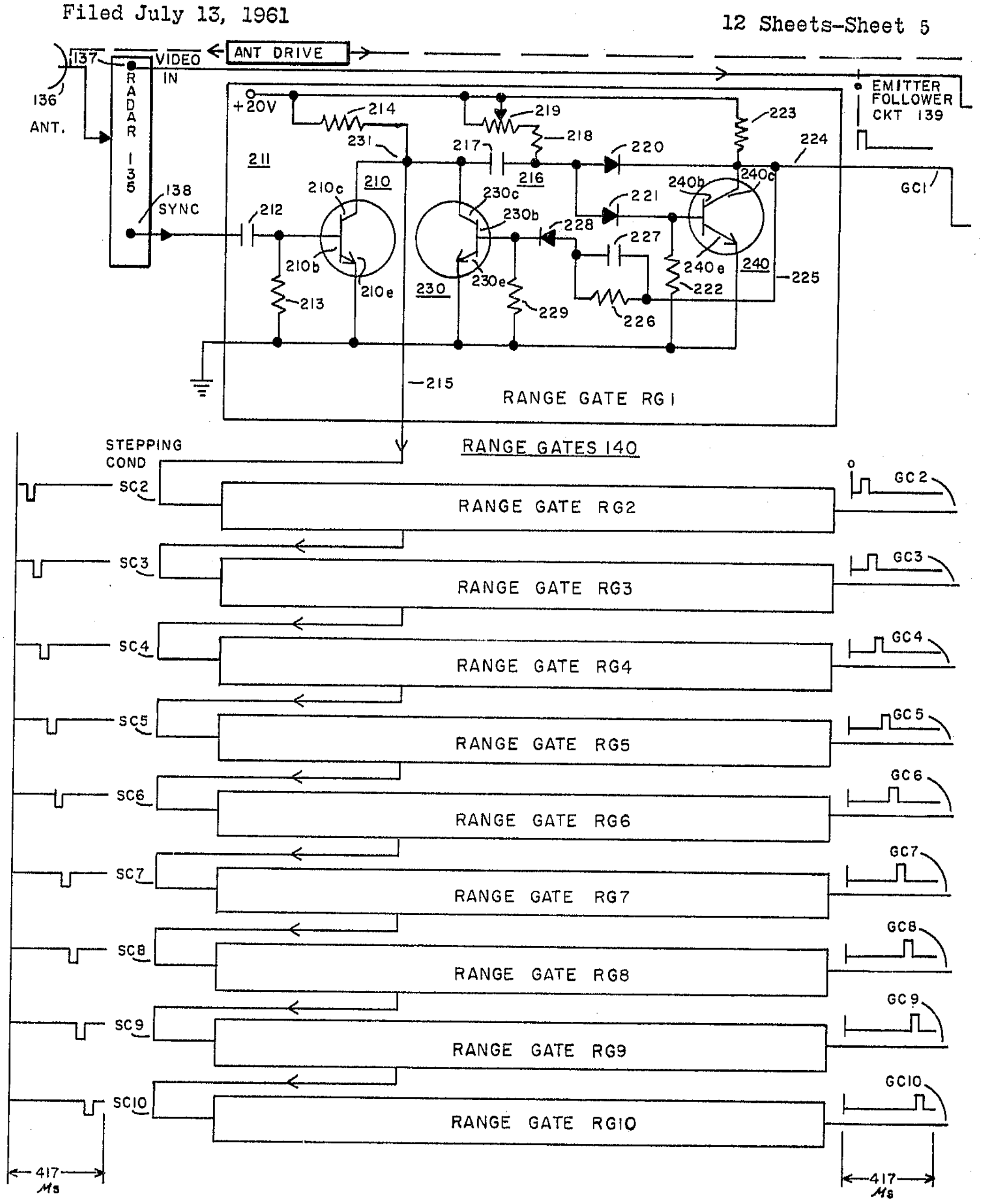

The specific circuit arrangement shown in FIGURE 12 sets forth the transistorized version of the range gate which may be utilized in both the terrain clearance and terrain profile converter systems of the present invention.

Each range generator RG1–RG10 basically comprises a one-shot multivibrator circuit which is operative to generate a positive square wave pulse of a predetermined duration for coupling to an associated rectifier, and a negative square wave pulse to the subsequent range generator in the sequence. With reference to FIGURE 12 the illustrated range generator RG1 basically comprises an input circuit 211 connected to the sync terminal 138 of the radar system, a first transistor 210 which is connected to the input circuit 211 to couple each incoming sync pulse received from the radar system 135 to transistors 230 and 240 which are connected to operate as a one-shot multivibrator circuit. Output conductor GO1 is connected to a rectifier circuit R1, an output conductor SC2 is connected to the input circuit for the next range gate RG2 in the cascaded group.

Transistor 210 may be of the type which is commercially available as a 2N332, and which basically comprises an emitter element **210*e* connected to ground, a base element 210*b* connected over a differentiating circuit comprised of capacitor 212, resistance 213 connected to the input circuit 211 and sync terminal 138 of the radar system, and a collector element 210*c* which is connected over resistor 214 to B+ (+20 volts). The collector output circuit of the first transistor 210 is also connected over conductor 215 (or stepping conductor SC2) to the input circuit of the subsequent range gate in the cascade arrangement, and also over timing circuit 216 including capacitor 217, resistors 218 and 219 to a pair of connected diodes 220, 221, the first diode 220 being connected to collector 240*c* of transistor 240, and the second diode 221 being connected to the base element 240*b* of transistor 240**.

Emitter element **240*e* of transistor 240 is connected to ground, base element 240*b* is connected to the timing circuit 216, and also over base resistor 222 to ground, and collector element 240*c* is connected over diode 220 to the timing circuit 216; over resistor 223 to positive potential (+20 volts); over conductor 224** to the gating conductor GC1 for rectifier circuit R1; and over conductor 225, a coupling circuit including parallel connected resistor 226 and capacitor 227, and diode 228 to the control circuit for transistor 230.

Transistor 230 which is connected to operate with transistor 240 as a one-shot multivibrator device includes an emitter element 230*e* connected to ground, a base element 230*b* connected over base resistor 229 and also to diode 228 in the output circuit of transistor 240; and a collector element 230*c* connected over common resistor 214 to positive potential (+20 volts), the common connection point 231 for the collector elements 210*c* and 230c of transistors 210, 230 providing the point of derivation of the negative square wave pulse which controls the subsequent range generator in the cascade arrangement.

In the absence of a signal on the input circuit 211 for the range gate RG1 first and second transistors 210, 230 are biased to cutoff and the transistor 240 is biased to conduct. As noted previously, the antenna 136 is electronically scanned though one azimuth heading from the foreground to the horizon at the rate of 2400 cycles per second, the vertical scan being repeated continually while the antenna 136 is being mechanically swept horizontally at one cycle per second rate through a sector scan of approximately 60 degrees. With the initiation of each radar vertical scan, a sync pulse is coupled over the radar sync terminal 138 to the input circuit 211 for range generator RG1 to the differentiating circuit including capacitor 212, resistor 213 which differentiates the leading edge of the incoming pulse to drive the base element 210*b* of transistor 210 sufficiently positive to effect the conductivity of transistor 210 for the period of application of the leading edge differentiated sync pulse.

As the transistor 210 conducts, the junction point 231 is in effect connected to ground over transistor 210, and since the junction point 231 was at 20 volts during the period that the transistor 210 was at cutoff, the sudden drop to ground as the transistor conducts results in the generation of the leading edge of a negative square wave pulse which is coupled over conductor 215 and stepping conductor SC2 to the subsequent range gate RG2 in the sequence. The negative going pulse is also coupled over capacitor 217 in timing circuit 216, and over diodes 220 and 221 to the base collector circuit of transistor 240 to drive the transistor 240 to cutoff.

In that transistor 240 was conductive prior to receipt of the sync pulse, and conductor 224 was in effect connected over transistor 240 to ground, as the transistor 240 is now biassed to cutoff, the voltage at the collector 240*c* rises towards the value of the source (+20 volts in the present example) to generate the leading edge of a positive square wave pulse which is coupled over conductor 224 to gating conductor GC1 for rectifier circuit 1 (see waveform adjacent conductor 224 in FIGURE 12).

The leading edge of the positive-going square wave pulse thus generated is also extended over the coupling network including resistor 226 and capacitor 227 and diode 228 to the base element 230*b* of transistor 230 to drive transistor 230 conductive, and thereby maintain junction point 231 at ground for the period which is now determined by the effective value of the components in a timing circuit 216.

That is, capacitor 217 immediately begins to charge over the path which extends from positive potential (+20 volts) over resistors 218, 219, capacitor 217 and transistor 230 to ground, the rate of charge being adjustable by varying the position of the adjustable arm on resistance 219. As shown in the above chart, in the present embodiment the arm 219 is adjusted to provide a charging time of 87 microseconds for the capacitor 217 in the first range gate RG1. As the capacitor 217 charges toward a more positive value, a positive-going pulse is provided as a result of the increasing potential on the capacitor 217, which pulse is coupled to the base 240*b* of transistor 240. After the elapse of 87 microseconds (determined by the setting of resistor 219), capacitor 217 accumulates a charge on its secondary plate which is sufficiently positive to bias transistor 240 to conduct. As transistor 240 conducts, the potential in the collector circuit 240*c* and on conductor 224 goes sharply negative to provide the trailing edge of the positive square wave pulse which was coupled over conductor 224 and gating conductor GC1 to the associated rectifier circuit R1. The negative-going pulse which appears in the collector circuit 240*c* of transistor 240 is also coupled over conductor 225, coupling circuit 226, 227, and diode 228 to the base 230*b* of transistor 230 to bias same to cutoff.

Since the sync pulse was of a relatively short duration (5 microseconds) transistor 210 has previously returned to its cutoff condition. With the cutoff of transistor 230 at this time, the charging circuit for capacitor 217 is interrupted, and the potential at the junction point 231 rises towards the value of the positive potential source (+20 volts). The positive-going pulse thus generated also appears on conductor 215 and is coupled over stepping conductor SC2 to the input circuit of the range generator RG2 to initiate the generation of a positive-going output pulse by range generator RG2 which is coupled over the gating conductor GC2 to the rectifier circuit $R_2$ associated with range generator RG2. Such action continues automatically until each range gate RG1–RG10 has been operated in sequence to generate a gating pulse to its associated one of the rectifier circuits R1–R10, the output pulse of each succeeding range gate in the sequence being initiated with the termination of the output pulse provided by the preceding range gate in the sequence. As indicated here before, the time duration of the pulses in the present embodiment is in the order of the value set forth in the chart above, the variation in the time duration of the pulses effected by the different range gates being accomplished by adjustment of the resistance 219 to correspondingly different values.

With reference to the waveforms which appear in FIGURE 12 adjacent the gating conductors GC1–GC10 which extend from the ten range gates RG1–RG10 to rectifier circuits, R1–R10, it will be apparent that each range gate RG1–RG10 is enabled at a different time period in each vertical sweep and for a different duration. As a result each rectifier circuit R1–R10 is operative to transmit a different segment of each signal set of a vertical antenna sweep which appears on common conductor 250 to its associated one of the switches S1–S10.

As shown in FIGURE 13, each of the rectifier circuits R1–R10 basically comprises an input circuit 270, a three stage transistor coupling circuit including transistors 290, 300 and 310, each of which has an emitter, base and collector element *e*, *b*, *c*, which are identified by the identification numerals 290*e*, 290*b*, 290*c*, etc., a rectifier 291 and an output circuit 311.

Input circuit 270 includes a pair of diodes including a first diode 271 having its cathode connected to the common conductor 250 for the received radar signals, and a second diode 272 having its cathode connected to the output circuit of the associated range generator RG1. The anodes of the diodes 271, 272 are connected common over resistance 273′ to a 30 volt positive potential source, and in the absence of a gating signal on gating conductor GC1, the diode 272 prevents diode 271 from conducting the radar signals on the common conductor 250 to the first rectifier circuit R1.

The first transistor 290 in the rectifier circuit R1 is connected in an emitter-follower configuration, the collector element 290*c* being connected to B+ (20 volt positive), the base element 290*b* being connected over coupling capacitor 273 to the input circuit 270 and also to the signal level compensating circuit 276, and the emitter element 290*e* being connected over diode 291 to base element 300*b*, and over resistor 274 to a negative potential source (−30 volts) and over resistance 275 to compensating circuit 276.

The D.C. signal level compensating circuit 276 includes a voltage divider having a first resistor 277 and a second resistor 278 (adjustable) connected in series between the base input circuit and ground, and a capacitor 280 connected across resistance 278, and a diode 279 connected across resistance 277, resistor 275 being connected between the negative potential source (−30 volts) and the junction of series connected diode 279 and capacitor 280 which is also connected to the junction of resistors 277, 278. Resistance 278 is of a variable nature to permit adjustment of the value of the direct current voltage which is coupled to the input of the transistor 290 along with the assigned segment of the incoming radar signals, the purpose of the circuit being to provide a level of direct current voltage which compensates for the loss which occurs in the transmission of the signals through the further stages of the rectifier circuit R1, and particularly in the base-emitter circuits of transistors 300 and 310.

The succeeding stage of rectifier circuit R1 comprises a transistor 300 connected in an emitter-follower configuration, collector element **300*c* being connected to a positive potential source (+20 volts), base element 300*b* being connected over rectifier 291 to the emitter output circuit of transistor 290 and over an RC circuit including parallel connected resistor 292 and capacitor 293 to a negative potential source (−30 volts). The emitter element 300*e* is connected over resistor 296 to the negative potential source (−30 volts) and to the input circuit for transistor 310** in the succeeding emitter-follower stage.

Transistor 310 includes collector element **310*c* connected to a positive potential source (+20 volts), base element 310*b* connected to the output circuit of the transistor 300 in the preceding emitter-follower stage, and emitter 310*e* connected over resistor 297 to the negative potential source (−30 volts), and also over resistor 298 to switch S1. Transistors 300 and 310 are provided for impedance matching since the circuit must drive a 4.7K resistance load 297, and without such match the load would discharge capacitor 293**.

In operation, as the vertical sweep is initiated, and the incoming radar signals are coupled over radar video input terminal 137, input circuit 139 and the common conductor 250, the sync signal coupled over sync terminal 138 to the first range generator circuit RG1 results in the generation and coupling of a square wave pulse over conductor 224 to the cathode of the diode 272 to bias the diode 272 non-conductive, and thereby promote a rising potential at the anode of the connected diode 271. As the potential rises in the direction of the positive potential source (+30 volts) diode 271 conducts to couple the radar video signals on the common input lead 250 over coupling capacitor 273 to the first stage of rectifier circuit R1 for a period equivalent to the duration of the square wave pulse which is coupled over gating conductor GC1 by range generator RG1 (87 μs. in the present example).

The first 87 μs. segment of the radar incoming signals as thus coupled over capacitor 273 is mixed with the direct current voltage provided by the direct current voltage mixing circuit 276, and coupled over the emitter-follower 290 for rectification by rectifier 291 and coupled over the RC circuit 292, 293 to the input circuit for the second transistor stage 300.

It will be apparent that the signal input to the first transistor stage 290 will comprise a variable signal having a duration equivalent to the duration of the square wave output pulse of a range generator (87 μs.), an amplitude determined by the segment of the radar video input signals received during such time period, and a direct current portion of a value in excess of ground as determined by the value of the direct current voltage mixed with the signal by the clamp circuit 276.

With the coupling of such signal over the rectifier 291, a signal will be provided to the base of the second stage transistor 300 which is a straight line direct-current function having an amplitude above zero which is the same as the amplitude of the output pulse of the first stage transistor 290. Such amplitude is in turn determined by the value of the radar input signal pulse, the clamp signal of circuit 276, and varies with changes in the radar signals in the input circuit during the period of time (87 μs.) that the diode 271 is rendered conductive by range gate RG1. Capacitor 293 charges to the value of the direct current signal output of rectifier 291 during the period of conduction of the input circuit 270 (87 μs.), and the time constant of capacitor 293 is of a value sufficient to maintain the emitter followers 300 and 310 conductive until the following vertical antenna scan occurs and the range generator RG1 once more effects energization of rectifier circuit R1. Thus it will be seen that signal output of rectifier circuit R1 comprises a steady direct current signal which is related in amplitude to the incoming radar signals for the first segment (87 μs.) of the antenna scan, and which persists for the interval between successive vertical scans.

Each of the rectifiers R1–R10 is thus controlled by its associated one of the range gates RG1–RG10 to couple a direct current signal having a value related to the value of the radar input signals on the common conductor 250 for a different time segment of each sweep.

The direct current signal output of each rectifier circuit is coupled to the wiper of a different one of the commutator switches S1–S10. As noted above, each of the ten commutator switches 160 are controlled by an antenna servo to drive the wiper W over ten contact positions W1–W10 as the antenna 136 moves through its 60 degree azimuth sweep, the wiper W of the different switches S1–S10 moving across the corresponding ones of the ten positions in synchronism with each other and at the azimuth scan rate of the antenna.

The ten positions of each commutator switch, such as S1, are connected to ten different storage bins in an associated storage device, such as storage device A. Thus in each azimuth scan, the wiper W1 on switch S1 selectively engages each of the ten different bins 1–10 of associated storage device A, the wiper on switch S2 selectively engages each of the ten bins of storage device B, etc.

Since the antenna moves through a sector of 60 degrees in each scan, and the commutator switches S1–S10 are operated over ten positions in synchronism therewith, the antenna scan is in effect divided into ten azimuth sectors of approximately six degrees each.

Figure 14:
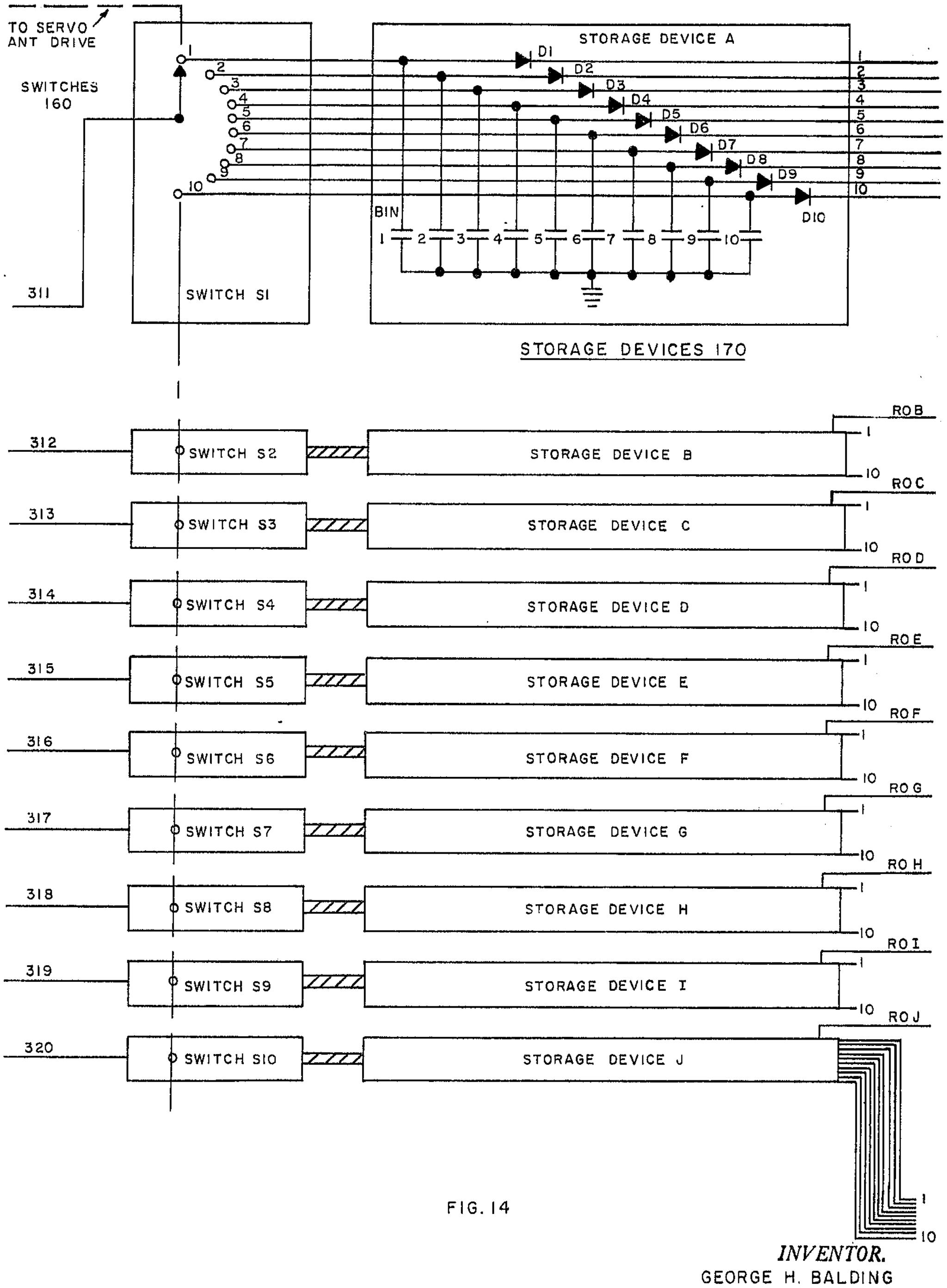
Figure 15:
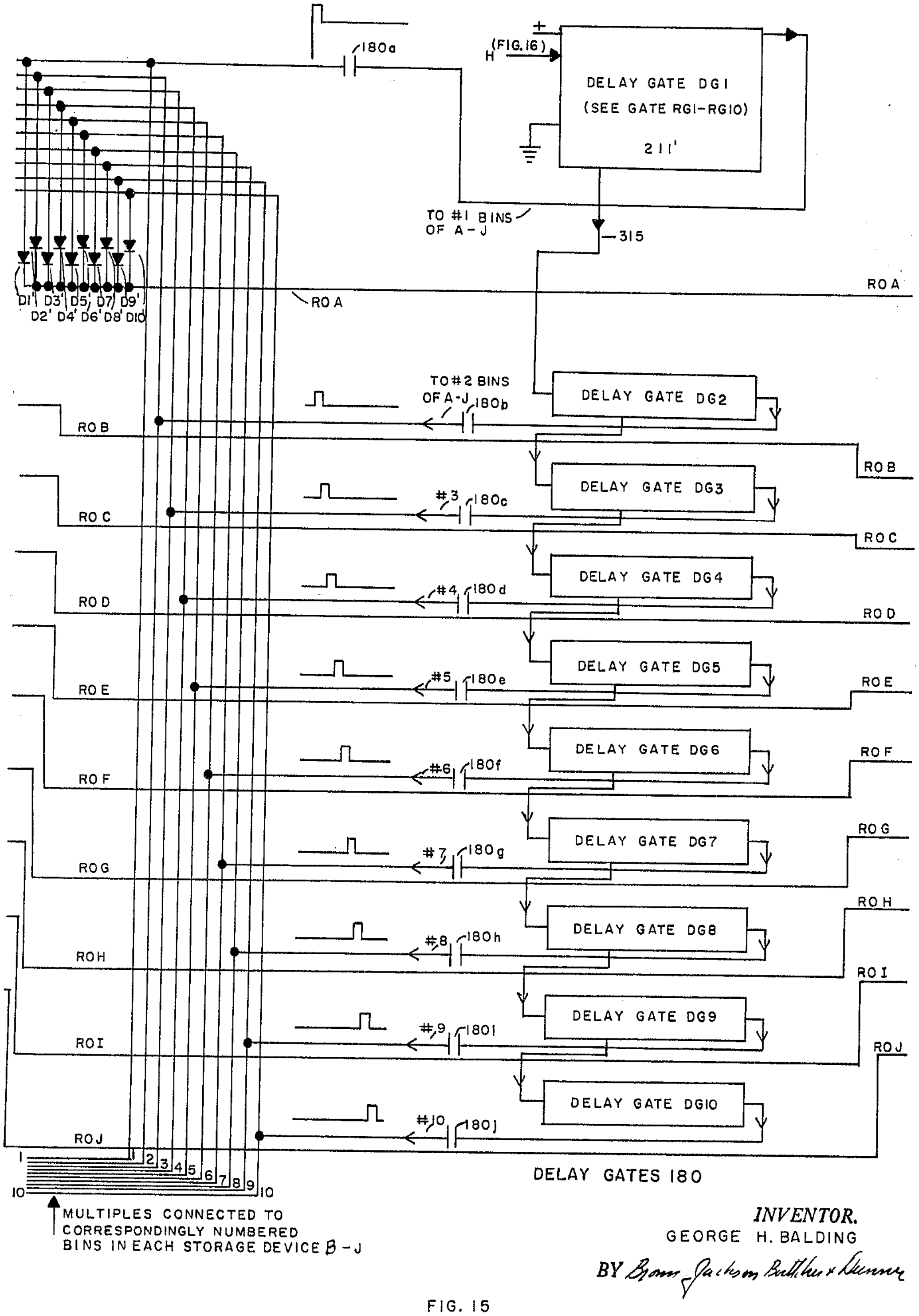

As shown in FIGURE 14, each of the commutator switches S1–S10 will be in its first position as the antenna 136 initiates a scan from its one extreme azimuth position. As the first vertical scan is effected by the radar, the ten different successive segments of the scan will be coupled over the rectifier circuits R1–R10, and switches S1–S10 to the first bin of each of the storage devices A–J, the first segment being stored on the first bin of storage device A, the second segment being stored on the first bin of storage device B, etc. In effect therefore the signal stored on the first storage bin of the ten storage devices A–J represents the terrain detected in a vertical scan or a "range slice." Since a number of vertical scans occur during the period that the antenna moves through a six degree sector (and the wipers W1–W10 are in contact with the first bins) each bin stores the largest amplitude signal which is received during its assigned segment (or range) of the vertical scan. Thus the signal in a bin represents the highest terrain for the range of the profile slice to which it is assigned to represent.

As the antenna moves to the second azimuth section of the scan (6°–12°) the switches S1–S10 move to the second wiper position, and the ten different successive segments provided by the range gates RG1–RG10 and rectifier circuits R1–10 are coupled in succession to the second bins of the storage devices A–J. It is apparent therefore that the like storage bins of storage devices A–J store information relating to a separate range slice for the second azimuth sector, each bin in storage devices A–J representing a different range in the profile represented by the second bins as a group. Manifestly readout of the information relating to each of the profiles represented by the signals in the different bins would provide a means of presenting a display of the actual terrain at the different ranges as it appears in the true world.

*Read-out*

The readout of the information on the storage devices is accomplished in the manner previously set forth in the disclosure relating to the terrain profile generator system of FIGURE 4, delay gates 180 being used in the present arrangement to interrogate the ten storage bins which store the information relating to each different range, and coupling such information to ten different clipper circuits TC1–TC10. The readout univibrator devices of FIGURES 4 and 5 may therefore be used as delay gates DG1–DG10. Alternately, for the purpose of providing a completely transistorized system, whereby a substantial reduction in the mounting space requirements is obtained, the delay circuits having the structure of range gates RG1 (FIGURE 12) may be used. In an arrangement in which the transistorized structure is used, the input circuit 211′ (FIGURE 15) for delay gate DG1 will be connected over a delay gate 205 (FIGURE 16) to the horizontal sync output of the timing circuit 18 for the display device 16, delay gate 205 being the same structure as the range gates RG1, if desired. The negative square wave output of the first delay gate DG1 is coupled over conductor 215′ to the input circuit 315 for the second delay gate DG2, etc., the delay gates 1–10 being thus connected for cascade operation responsive to the coupling of each horizontal sync pulse (delayed by 12 microseconds) to the first delay gate DG1 of the sequence. In the case of the delay gates DG1–DG10, the adjustable resistors 219′ (such as resistors 219 in FIGURE 12) are adjusted to control each delay gate to provide a pulse of equal length (5.1 microseconds), whereby each horizontal line is in effect divided into ten equal segments of display as shown below.

The positive square wave provided by each delay gate, such as DG1, is coupled to a readout circuit, such as used in the terrain profile system, each of which includes a capacitor, such as 180A and a diode, such as D1′, connected by means of a diode D1 to the first bin of each storage device A–J to thereby sample or "interrogate" simultaneously each of the first bins in the ten storage devices A–J during the first segment of the ten segments of each horizontal trace as provided by delay gates DG1–DG10; the control signal provided by the second gate DG2 during the second segment of the ten segments of the horizontal trace is connected over capacitor 180B to the second bin in each of the ten storage devices A to simultaneously interrogate each of the second bins for storage devices A–J during the second time interval of each horizontal trace; the control signal provided by the third delay gate DG3 is coupled over capacitor 180C to the third bin of each storage device A–J, etc. Thus the signals in the first ten bins of the ten storage devices, the signals in the second ten bins, the signals in the third ten bins, etc., are coupled to the video display device for a successive increment of time in each horizontal sweep of the raster.

Each storage device, such as storage device A, includes a multiple readout lead, such as ROA, connected between each of the ten readout circuits for the ten bins 1–10 in a storage device, such as A, and an individual terrain clipper circuit, such as TC1.

In operation as the first horizontal sync pulse for a raster trace is coupled by the timing circuit 18 and delay circuit 205 over conductor H to the input circuit 211′ of the first delay gate DG1, the delay gate DG1 operates as a univibrator in the manner set forth previously herein (see for example the description relative to range gate RG1) to provide a square wave output pulse having a duration which is noted above is approximately $\frac{1}{10}$ of the duration of a horizontal line trace.

The square wave output pulse is coupled over output circuit 315 to the second delay gate DG2 and also over capacitor **180*a* to the readout circuit for the first bin of each of the ten storage devices A–J. As the square wave output is coupled over capacitor 180*a* to the diodes D1 and D1′ associated with the first bin 1 in the storage devices, for example, the diode D1′ conducts to couple a signal of a value related to the signal stored on the associated storage capacitor in the first bin to the readout lead, such as ROA, for the first storage device A and the terrain clipper, such as TC1, which is connected thereto. The same square wave pulse simultaneously effects readout of the signal on the storage capacitor in the first bin of each of the other storage devices B–J, and the resultant signals are coupled over the associated ones of the readout conductors ROB and ROJ to the interconnected ones of the terrain clippers TC2–TC10. The manner in which the readout circuits for each bin (capacitor 180A, diodes D1, D1′ for bin 1**, for example) are operative will be apparent from the detailed description set forth relative to the readout circuit for the terrain profile circuit (also see FIG. 11).

As the trailing edge of the square wave pulse is generated by delay generator DG1, and is coupled to the input circuit 315 of the second delay gate DG2, the delay gate DG2 is operative in the manner described to generate a positive square wave output pulse which is coupled over capacitor 180B to the second bin in each of the storage devices A–J to effect the readout thereof for a period equivalent to the second segment of the ten segments of each horizontal line trace.

The delay gates DG1–DG10 are operative in sequence, each being controlled to generate a readout pulse having a duration which is 5.1 microseconds (approximately $\frac{1}{10}$ of the duration of each horizontal line trace). As each delay gate DG1–DG10 effects the coupling of the readout pulse generated thereby to the interconnected group of ten bins in the different storage devices A–J, signals representative of the signals on each of the ten bins connected thereto are coupled over readout conductors ROA–ROJ to the ten interconnected clippers TC1–TC10. Since each readout pulse has an approximate duration of $\frac{1}{10}$ of a horizontal line trace, each group of bins (i.e., the group including the first bin in the ten storage devices, the group including the second bin in the ten storage devices, etc.), is controlled to provide the information relative to the profile of an azimuth sector represented thereby for a corresponding increment of each line trace. As a result, signal sets representative of ten profiles are read out of the storage in each line trace, each signal set being comprised of ten signals, each of which represents the highest terrain at a different predetermined range in the profile.

*Terrain clipper circuit 190*

The ten signals of each signal set (each of which sets represents an azimuth profile) are simultaneously coupled to the terrain clippers TC1–TC10, the different sets being coupled to the terrain clippers at different successive time periods in each line trace. Each signal in a set as applied to its associated clipper circuit, such as TC1, is mixed with a linear 10 volt sawtooth having the frequency rate of the raster vertical trace. The mixed signals are then applied to a diode which clips at ground level, and the resultant signals are amplified and coupled to the video mixer 12, for coupling over video amplifier 15′ to the display 16.

The D.C. voltage levels, vertical sawtooth and the video pulses are adjusted so that when the input video level is zero, no signal will appear at the output of the clipping diode, and therefore no signal will appear at video mixer 12. If the input level is +10 volts the clipping diode output will be a pulse as high as the vertical sawtooth sweep so timed in relation to the vertical sweep that the visual output will produce a bright horizontal line at the top of the display.

The addition of the vertical sweep voltages and the pulses representing the video information of the clipping diode and the shaping action of the clipper circuit produces a series of video pulses, the width of each pulse being a function of the readout pulse provided by the delay gates DG1–DG10.

The terrain clipper circuit TC1 which is so operative may be similar to the structure of clipper circuit 10 (FIGURE 6) which is operative as indicated above to effect mixing of the vertical sawtooth wave (which occurs at the frequency of the vertical trace of the raster) with the output signals of the storage devices and to clip the signals at ground level. The present embodiment further includes aircraft pitch means 202 which continually provides a D.C. voltage representative of the pitch attitude of the aircraft, and such signal is mixed with the vertical sawtooth over resistor 322 to effect the positioning of the terrain clearance display in the vertical direction as a function of aircraft pitch.

Figure 16:
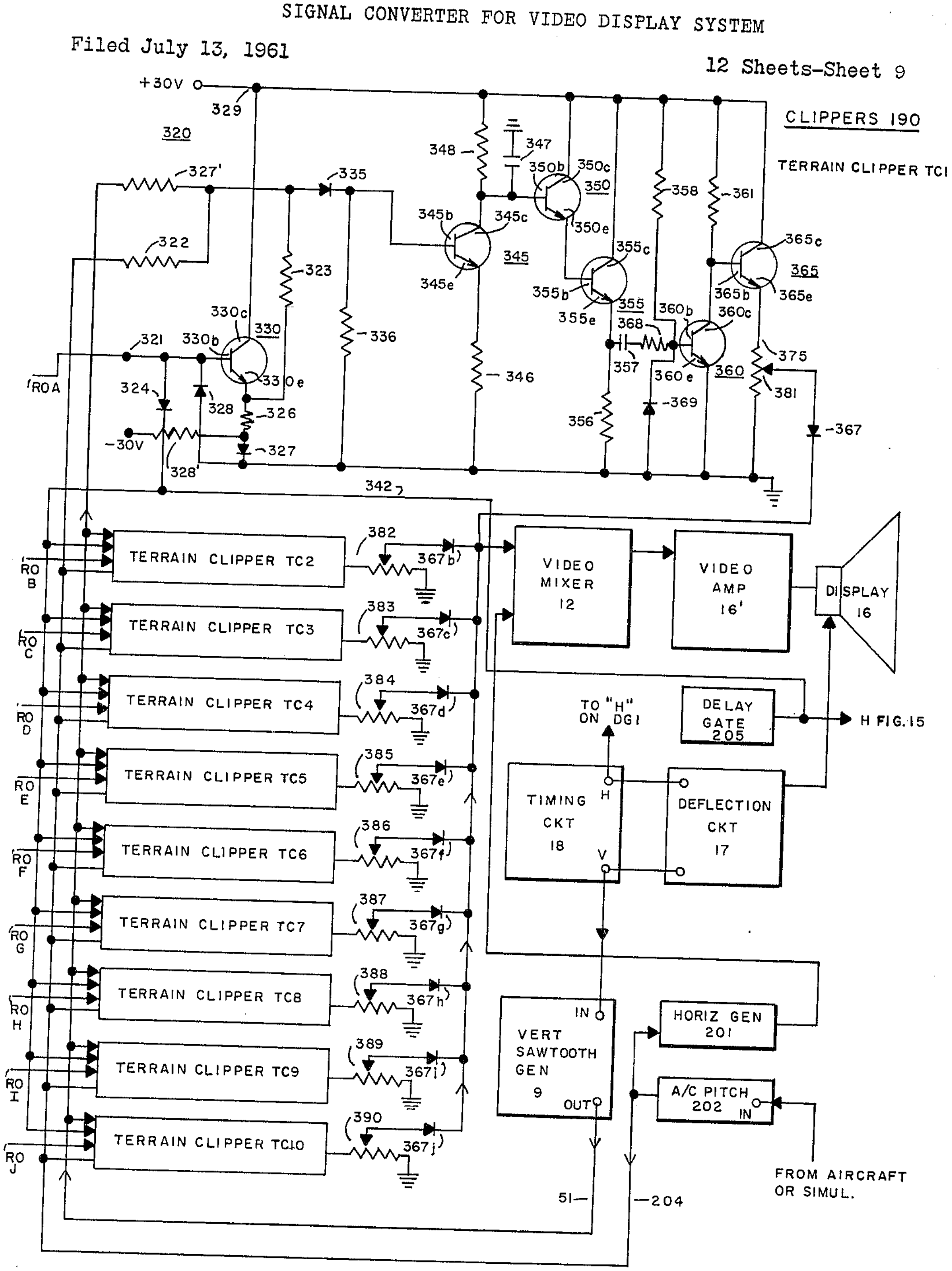

With reference to FIGURE 16, a transistorized embodiment of terrain clippers TC1–TC10 is shown thereat. As there shown, each clipper circuit, such as TC1, includes a first input circuit 320 including resistor 327′ connected over common conductor 51′ to the vertical sawtooth generator circuit 9, and also resistor 322 connected over common conductor 204 to aircraft pitch circuit 202, a second input circuit 321 for connecting the clipper circuit TC1 over its associated readout conductor ROA to the ten bins of the storage device A, and an output conductor 375 for coupling the output of the clipper circuit TC1 to an adjustable potentiometer 381. With a five volt input to each clipper TC1–TC10, the potentiometers 381–390 are adjusted to provide output pulses of 30 v., 27 v., 24 v., 23 v., 21 v., 18 v., 15 v., 12 v., 9 v., 3 v., respectively.

Each clipper circuit, such as TC1, further includes a first transistor 330 connected as an emitter follower for coupling input signals received from the storage circuits A–J to a diode clipper 335 and mixed with the vertical sawtooth which is coupled to the diode clipper over conductor 51′ and resistance 327′; a transistor 345 which is connected as an amplifier to the output of diode clipper 335 and cascade-connected emitter follower stages including transistors 350, 355; a transistor 360 connected as an amplifier, and transistor 365 connected as an emitter follower to couple the amplifier signals over the output circuit 375.

Briefly, transistor 330 which is coupled as an emitter-follower includes collector 330c which is connected to potential supply conductor 329 (+30 v.), a base 330b connected to input circuit 321 and over diode 324 to negative clamping pulse from delay gate 205 and over diode 328 to ground, and an emitter element 330e connected over resistors 326 and 328′ to negative potential source (−30 v.), the zener diode 327 being connected between the junction of resistances 325, 328′ and ground. Zener diode 327 provides a −9 volts potential to bias the emitter 330e of transistor 330 to a negative potential. Diode 328 is connected between the base 330b and ground to protect the base from damage by negative signals of an excessive value, which may appear on the base of transistor 330. Emitter 330e is also coupled over resistance 323 to the diode 335, whereby readout signals coupled to the transistor 330 are conducted to the diode 335 for mixing with the vertical sawtooth signal which is coupled over resistor 327′ to diode 335.

The cathode of diode 335 is connected over resistor 336 to ground, and to the base element 345b of transistor 345, amplifier stage including transistor 345 being connected to amplify the mixed signal output of the diode 335 for use in the subsequent stages.

Transistor 345 is connected as an amplifier and includes a collector element 345c connected over resistor 348 to positive supply conductor 329, and also to the base 350b of the transistor 350 in the next stage, a base element 345b connected to the cathode of diode 335 and over resistor 336 to ground, and an emitter-element 345e connected over resistor 346 to ground.

The amplified signal output which appears in the collector circuit of transistor 345 is coupled to the succeeding emitter-follower stage which includes transistors 350 and 355. Transistor 350 includes a collector element 350c connected to positive potential conductor 329, a base element 350b connected to the output circuit of the preceding amplifier stage (and over capacitor 347 to ground), and emitter-element 350e connected to the base 355b of transistor 355.

Transistor 355 includes collector element 355c connected to positive potential conductor 329, base element 355b connected to the output circuit of the preceding emitter-follower stage, and an emitter 355e connected over resistor 356 to ground, and also over coupling capacitor 357 and resistor 368 to the succeeding amplifier stage including transistor 360. Transistors 350, 355 are connected to provide the proper load match for the mixed signals in the coupling thereof to the succeeding amplifier stage including transistor 360. Capacitor 347 is used to smooth the clipped signal in order to give a more realistic display.

Transistor 360 which is connected as an amplifier includes emitter element 360e connected to ground, base element 360b connected to the output circuit of transistor 355 in the cascade emitter-follower stage and over resistor 358 to positive potential supply conductor 329, and over diode 369 to ground, and collector 360c connected over resistance 361 to the positive potential supply conductor 329, and also to the base element 365b of the transistor in the succeeding emitter-follower stage for the purpose of coupling the signals amplified over potentiometer 381–390 to diodes 367 A–J to video mixer 12. Diode 369 clamps the signal received over resistor 368 so that the signal will not go negative and inadvertently cut off transistor 360.

Since the radar antenna is stabilized in pitch, the horizon and the generated video signals are adjusted for changes in pitch of the aircraft. As shown in FIGURE 16, aircraft pitch circuit 202 continually provides a direct current signal which has an amplitude constantly related to the pitch of the aircraft, and such signal is coupled over conductor 204 to the clipper circuits TC1–TC10 for the purpose of reflecting the changes in the aircraft pitch. As taught in more detail in my above-identified copending application, the variation of the direct current by a signal which is coupled to the control grid 83 of the mixer tube 80 (FIGURE 6) will result in a corresponding change of the level of amplitude at which the pulses are effective. Manifestly, by increasing the bias signal, a greater portion of the raster trace will be effected before the amplitude of the composite signal including the signals representative of the terrain (and as combined with the vertical sawtooth generator) will be sufficient to overcome the bias. Accordingly the trace of the profile will be initiated on a lower portion of the screen (to thereby indicate a nose-up condition of the aircraft). In a similar manner as the aircraft is maneuvered to a nose-down position, the direct current bias coupled to the mixer tube 80 will be reduced and the initial traces of the profile will occur at an earlier portion of the trace. In the above mentioned transistorized clipper the horizon line signal is coupled over conductor 204, resistor 322 to diode clipper 335.

As a further aid to the pilot an artificial horizon line is generated and mixed with the terrain clearance video.

The horizon line generator 201, as in the previous application, is operative to provide signals which trace a horizon line at different locations on the raster with changes in pitch of the aircraft, the change in signal output of the horizon line generator being effected by variation of the amplitude of direct current voltage signal continuously with changes of the aircraft pitch.

*Horizon line generator*

The circuitry for the horizon line generator 201 is similar to that of the constant altitude line circuit 14 (FIGURE 10) the only variation being in the elimination of capacitor 125, and accordingly the circuit is not reshown herein. In the use of the circuit shown in FIGURE 10, the potentiometer 120 is connected as the aircraft pitch sensor 202 which provides the direct current to the horizon generator, and also to provide the direct current signal over conductor 204 to the terrain clippers TC1–TC10, such signal being representative of changes in aircraft or simulator pitch. Elimination of capacitor 125 changes the signal output of the circuit to a square wave pulse, the duration of which is determined by the setting of the potentiometer 120 and the amplitude of the vertical sawtooth wave input.

*Generation of terrain clearance display*

With reference now to FIGURES 17–21, the manner of operation of the system to provide a terrain clearance display in response to the detection of signals representative of the terrain which lies in the path of an aircraft is now described hereat. The nature of a terrain to be scanned by the radar system is shown in FIGURE 17, and the resultant display provided by the system is shown in FIGURE 21. The signal values herein have been selected for the purpose of illustrating the manner in which the system is operative to convert signals from a low frequency signal to signals having a frequency which is compatible with the frequency of a raster presenting display device and are therefore primarily of an exemplary nature. It will be apparent, of course, that different radar systems can be employed to provide different signal values, and the converter system may be readily adapted for use therewith.

(a) *Signal detection and storage*

In the present exemplary description, the radar antenna is assumed to be operative through an azimuth scan of 60 degrees from left to right (30 degrees to either side of the line of flight of the aircraft), and the radar beam is simultaneously electronically deflected through a vertical segment of 60 degrees (+20 degrees to −40 degrees). The azimuth scan is mechanically accomplished at 1.5 cycles per second and the vertical scan is electronically effected at the rate of 2400 cycles per second.

As will be shown hereinafter, the novel converter unit is operative to store signals which are detected over such area of scan (60° azimuth and 60° vertical) and is operative to present on the display device, the information obtained in the 60 degree azimuth scan and the information obtained in 40 degrees of the 60 degree vertical scan (see FIGURES 17 and 21). The horizon line which is continually representative of the altitude of the plane always occurs along the horizontal median of the display presented on the display device. The display shown in FIGURE 21 is provided when the aircraft is at a first altitude and a given position relative to the terrain shown in FIGURE 17. If the aircraft is at the same relative position but at a lower altitude than the altitude indicated in FIGURE 17, the display area (which may be likened to a picture window which views an area of 40°×60°) is in effect moved downwardly in its position relative to the terrain illustrated in FIGURE 17, to provide a display on the display device of a correspondingly lower portion of the terrain. If the aircraft were at the same relative position, but at a higher altitude the display area or window (40°×60°) is in effect raised relative to the illustrated terrain to provide a correspondingly higher sector of display. Stated in another manner, in the first instance (when the aircraft is at the lower altitude) the mountain peak will move upwardly in the display presented on the display device, and in the second instance, the mountain peak will move downwardly on the display presented on the display device.

With reference to FIGURE 18, a set of curves is shown thereat which set forth exemplary signals which may be provided by a radar system having a scan of the type described above relative to flat terrain, and signals for certain illustrative segments of the terrain illustrated in FIGURE 17. Curve A is representative of the signals which may be provided when the aircraft is in flight over flat terrain, it being apparent that a sawtooth-like waveform represents the ranges from 0 to 15,000 yards (which is assumed herein to be the maximum range of the radar), and that the remainder of the curve represents the horizon line as it appears to the radar. Curve B illustrates the signal information representative of range and elevation which are generated for storage in the first group of bins in the storage devices A–J responsive to operation of the radar in the scan of the first azimuth segment or slice of the terrain (30° left-24° left) and curve C represents the signal information representative of range and elevation which are provided by the radar during the scanning of the fifth azimuth segment of the terrain (6° left to zero).

With reference to FIGURE 17, and assuming the radar antenna 135 is operated through its first azimuth sector (30° left-24° left), and simultaneously is electronically scanned vertically through 60 degrees (−40° to +20°) relative to the terrain shown in FIGURE 17, a set of signals such as represented by curve B (FIGURE 18) is coupled over video input circuit 137, and input circuit 139, to the common conductor 250 for gating by the range gates RG1–RG10 and commutating switches S1–S10 to the bins of the different storage devices SDA–SDJ. It is assumed in the present example that range gate RG1 is timed to gate the signals received from the radar system during the first six degrees of each vertical scan, the received signals being representative of the range and elevation. Range gate RG2 gates the signals received during the second segment of the vertical scan (−34 to −28 degrees), range gate RG3 gates the signals received during the third segment, etc.

With reference to FIGURES 17, 18 and 19, it will be apparent that during the initial portion of the vertical scan of the terrain illustrated in the first azimuth segment, the radar will provide signals representative of the elevation of the antenna and of the contour of the terrain from 0 to 3,000 yards, the exemplary signals (with the aircraft at the altitude and position illustrated relative to the terrain in FIGURE 17) being shown in curve B of FIGURE 18. The peak signal during the first portion of the vertical scan in the first azimuth segment as shown by curve B is in the order of 8.3 volts. The signals including the 8.3 volt signal as received are gated over rectifier R1 and the first position of switch S1 to bin 1 of the first storage device SD1 and the peak signal of the signals received is stored in the storage device.

In the next six degrees of the vertical scan in the first azimuth segment of the terrain shown in FIGURE 17, a peak signal of 6.2 volts representative of the terrain and elevation is detected, as shown by curve B in FIGURE 18. Range gate RG2 is operative during such portion of the scan to couple the 6.2 volt signal over the gate conductor GC2, rectifier R2 and the first position of switch S2 to bin 1 in the second storage device B. As the radar vertical scan continues into the next vertical segment, the signals provided as shown by the curve B (FIGURE 18), indicate that the terrain detected lies at 6,000 yards. Manifestly the radar cannot detect the nature of the terrain at 9,000 yards when it is located behind the terrain at 6,000 yards.

Since the radar detects the terrain at 6,000 yards, the signal output during this segment of the vertical scan remains the same as that provided during the previous segment (6.2 v.), and range gate 3 couples the incoming signals received from the radar over rectifier R3 and the first position of switch S3 to the first bin of the storage device C.

As the vertical scan of the radar continues, signals representative of the terrain detected at 12,000 yards will be provided during the period that the range gate RG4 is operative, and as shown in FIGURE 18, a five volt signal is provided by the radar which is coupled over rectifier R4 and the first position of switch S4 to the first bin of storage device D.

At this time it is noted that the radar set is operative to provide a signal subsequent to the last detected terrain in a vertical scan which is the same as that provided for the last terrain. As a result, as shown in curve B, a five volt signal is coupled to the first bin of each of the remaining storage devices detected in such scan.

As the radar antenna is moved through successive vertical and azimuth angles, the incoming signals are coupled to corresponding different groups of bins in the storage devices. The peak signals received during the vertical sweep in the second azimuth sector are stored in the second bins of the storage devices, etc. As a further exemplary showing, the set of signals provided in the vertical electronic scans during the fifth segment of the azimuth scan are also shown in FIGURE 19, and as there shown, the signals received during such period are coupled to the fifth bin group in the storage devices SDA–SDJ. The manner of storage of the remaining signals received in each cycle of the antenna will be apparent therefrom.

As an azimuth scan is completed, information relative to the true world conditions in an area having a 60 degree width and a 60 degree height will be stored in the storage device 170. It is apparent that as the aircraft proceeds along its line of flight the continued scanning of the radar will effect corresponding changes in the representative signals which are stored in the storage devices.

(b) *Readout of signals for use with display device*

The delay gates 180 are operative as described above at the horizontal rate to effect the readout of the signals in the storage device at a relatively high frequency rate and to effect the coupling thereof over terrain clippers 190, video mixer 12, and video amplifier 16′ to the display device 16 to effect a display of the terrain which was detected by the radar system. In the present embodiment, ten delay gates DG1–DG10 are operative in sequence during each horizontal line trace of the raster (which is the conventional right to left trace herein, with the raster moving from the top to the bottom of the screen). The operating periods of each delay gate are equal, the horizontal line being then in effect divided into ten time intervals or increments. During the first increment delay gate DG1 operates to couple the signals in the first bin of each of the storage devices A–J to the terrain clippers TC1–TC10; during the second increment of the horizontal line trace delay gate DG2 operates to couple the signals stored on the second bin of storage devices A–J to terrain clippers TC1–TC10, etc., such operation having been described in some detail hereinabove, and being represented by the chart of operation of the delay gates during each line trace which is shown in FIGURE 20.

(c) *Generation of signals for presentation on display device*

With reference to FIGURE 21 and specifically the portion of the display for the first azimuth sector (30 degrees L–24 degrees L) of the terrain shown in FIGURE 17, it is noted that as the readout signals obtained from the first bins in the storage devices SDA–SDJ during the first segment of the first horizontal line trace are coupled to the terrain clippers TC1–TC10 respectively, the value of the readout signals (10 v.—5 v.=5 v.), combined in the respective terrain clippers with the vertical sawtooth (its lowest value during the first horizontal line trace as shown by the waveform adjacent the left hand margin of the display in FIGURE 21) is insufficient to exceed the established bias value in each of the clipper circuits TC1–TC10, and accordingly the outfit of the clippers TC1–TC10 during the first segment of the horizontal line sweep will be zero. As shown by the waveform adjacent the right hand margin of FIGURE 21, the horizon generator 201 couples a square wave signal over video mixer 12, video amplifier 16′ to the display device during the portion of the trace of the raster which extends from the top marginal edge of the display to the horizon line, which signal is sufficient by itself to cause the raster to be traced in a light shade of white during such portion of the display which extends between the upper marginal edge of the display and the horizon line (assuming that the output of the terrain clippers for such period of the trace is zero by reason of the value of the signals stored therein).

As the trace continues downwardly, and specifically as the trace reaches the first line in which the peak of the mountain shown in FIGURE 17 is to be traced, the value of the vertical sawtooth signal has increased sufficiently so that as combined with the output signal of bin 5 (10—.5=9.5 v.), terrain clippers TC5–TC10 will conduct to trace the first portion of the peak (Point A in FIGURE 21 on the display during the fifth segment of the horizontal line trace being effected at such time).

As noted heretofore, each of the potentiometers 381–390 for the terrain clippers TC1–TC10 are set to different values to provide different scales of gray on the display as its associated terrain clipper is energized, the lower number clippers have higher output levels. Thus the signal output level of terrain clipper TC1 is higher than the signal output level of terrain clipper TC2, etc.

In that the terrain clipper TC5 associated with storage device SDE has a higher output level than terrain clippers TC6–TC10 and the video signal coupled to the display device for display purposes (and the shade of gray provided) will be basically determined by such signal level. It is noted that even though terrain clippers TC6–TC10 are energized simultaneously with terrain clipper TC5, the back-bias provided by the diode 367*e* prevents the lower value signals from passing through the diodes associated with the terrain clippers TC6–TC10 to the video mixer 12.

Since further portions of the mountain plot are traced during the same horizontal line trace, the clippers are energized in a like manner during the corresponding segment of the horizontal line trace to provide the mountain display and thereafter to provide the sky portion in the remaining segments of the horizontal line trace.

As the raster trace continues toward the horizon line, the peak is outlined on the display as indicated.

As the horizon line is traced by the negative going portion of the horizon signal pulse, and the raster proceeds beyond the horizon (as shown in FIGURES 17 and 21 and the values in bin 1 set forth in FIGURE 19), the signal stored in the first bin of each of the storage devices SDA–SDV is still insufficient with the vertical sawtooth (which is increasing in value as the trace progresses), to overcome the clipper bias, and since the horizon generator 209 no longer couples a positive value signal to the display unit, the first increment (provided by the signals in bin 1 of the storage devices) of each horizontal line will be black for a number of the successive horizontal lines which are traced (see FIGURE 21—SEGMENT 1). As the raster trace advances to point B, the signals coupled from the bins of storage device D–J (10 v.—5 v.=5 v.) to terrain clippers TC4–TC10 are now sufficient when added to the vertical sawtooth wave to overcome the reference bias established in the clipper circuit, and accordingly terrain clippers TC4–TC10 will be energized. Since the signal level of terrain clipper TC4 is higher than the level of the clipper TC5–TC10 the scale of grey displayed on the display device is determined by the output of clipper TC4 as noted above.

As the raster trace approaches the bottom marginal edge of the display, the value of the signals stored on the ten bins of the storage devices effect the indicated display for the ten increments of each horizontal line of the trace representative signals stored on the first and fifth bins of the storage devices being shown in FIG. 19.

As point C (FIGURE 2) on the display is reached, the signals stored on storage devices SDC and SDB (10 v.—6.2 v.=3.8 v.) are now sufficient with the amplitude of the vertical sawtooth during the line trace to overcome the established bias reference in terrain clippers TC3, TC2, and accordingly clippers TC3 and TC2 become conductive during the first increment of the horizontal lines which occur subsequent to point B on the trace. As before, the back-bias established by terrain clipper TC2 (the terrain clipper TC2 having the higher bias level in the gray circuit settings) will prevent the signal output of the terrain clippers TC3–TC10 from being coupled over the video mixer 12 to the display device 16 during the first segment of the line traces from points B to C. After point C, the terrain clippers TC1–TC10 are energized, and clipper TC1 determines the gray shade on the display.

It is apparent that the signals representative of the terrain at the shorter ranges (such as for example, the 3000 yard range) were insufficient (even with the sawtooth at its highest value at the bottom of the display) to overcome the bias level established by the clipper circuits, and accordingly only a small portion of the terrain at 6000 yards and none of the terrain at 3000 yards appears on the display presented to the pilot when the aircraft is at the altitude indicated by the horizon line.

Assuming now that the aircraft is in the same relative position but at a lower altitude, or alternatively that the aircraft is pitched downwardly from its illustrated position, the aircraft pitch circuit 202 will effect a corresponding reduction in the amplitude of the direct current bias which is coupled over conductor 204 and resistor 322 to the mixer circuit in the terrain clipper TC1–TC10, and as a result the signals in the bins will be sufficient with the applied sawtooth to overcome the bias at an early one of the horizontal line traces in the raster. The earlier appearance of the signals on the display will of course have the effect of moving the terrain upwardly on the display, and providing a display of the closer ranges, which is consistent with the change which would occur in one's view of the true world terrain through an aircraft windshield.

In a similar manner if the aircraft is at a higher altitude (or pitched upwardly from the illustrated position), the value of the bias signal applied to the clipper is increased to move the position of the display downward on the display device which is again consistent with the changes which would occur in the true world viewing.

The novel converter device disclosed hereinabove makes possible the linking of different types of systems which are heretofore basically incompatible by reason of the different frequency operating characteristics of the systems. Although the disclosed converter is operative to convert signals of a lower frequency to signals of a higher frequency the device obviously also has utility, and is operative, to convert high frequency signals to signals of a lower frequency.

In the illustrated applications the converter system effects the provision of signals of a frequency compatible for display on a cathode ray tube (15,750 c.p.s.) from signals obtained at a 1 cycle/second rate, and specifically makes possible the presentation of radar detected information on a television type raster of a display device with a consequent improvement in viewing of the information by the user.

In addition to the provision of new displays in mobile units, such as aircraft, and in fixed installations, such as simulators, the novel converter device is also useful in the storage of data information, such as obtained for inventory control purposes, computer purposes, and the like, and the display of such information in a bar graph presentation. That is, it is apparent that by storing information in the first bin of each of a plurality of storage devices such as used in the terrain clearance system, the readout of the information according to the illustrated techniques will provide a bar graph which lies in the first vertical segment of the display. Successive bin groups may be used to store information for presentation as successive vertical bins on the display, the character of the bars being determined by the information stored in the associated group of bars. Other similar uses of the novel converter device, as well as the novel subcombination consisting of the storage and readout circuits and techniques taught herein will be readily apparent to parties skilled in the art.

While what is described is regarded to be a preferred embodiment of the invention it will be apparent that variations, rearrangements and modifications and changes may be made therein without departing from the scope of the present invention as defined by the appended claims.

What is claimed is:

1. In a converter system for converting signals cyclically provided at a first frequency to signals for use with equipment operative at a second different frequency, an input circuit over which signals are cyclically received at said first frequency, a plurality of different signal storage means, switching means for dividing said signals received in each cycle into segments including means for coupling each different segment of the signals to a different one of said storage means for storage therein, sampling means for selectively generating sampling signals at said second frequency, signal derivation means coupled to said storage means, and means for coupling successive sampling signals from said sampling means to said signal derivation means to provide successive readout signals related in value to the stored signals in successive ones of said storage means.

2. In a converter system for converting signals cyclically received at a first frequency to signals of a second higher frequency, an input circuit, a plurality of different signal storage means, switching means for dividing the signals received over said input circuit in each cycle into segments including means connected between said switching means and said storage means to couple each different segment to a different one of said signal storage means for storage therein, signal derivation means coupled to said storage means operative in successive energizations to provide a signal corresponding to the signal stored on a different one of said storage means without significantly varying the value of the stored signals, means for providing sampling signals at said second higher frequency, and means for coupling successive ones of said sampling signals to said signal derivation means to effect energization of said signal derivation means at said higher frequency.

3. In a converter system for converting signals cyclically provided at a first frequency to signals of a second higher frequency, an input circuit over which signals are cyclically received, a storage device including a plurality of discrete capacitor storage members, switch means for dividing the signals received over said input circuit in each cycle into segments, circuit means for coupling each different segment of the signals to a different one of said capacitor storage means for storage thereby, sampling means for generating sampling signals at said higher frequency, a plurality of signal derivation means, means connecting each of said signal derivation means to a different one of said capacitor storage members, each of said signal derivation means being operative in response to a sampling signal to derive a representative signal from the connected one of the capacitor storage members substantially without varying the value of the signal therein, and means for coupling successive ones of said sampling signals from said sampling means to different ones of said signal derivation means to control the same to derive a set of signals at said higher frequency rate.

4. In a converter system for converting signals cyclically provided at a first frequency to signals of a second higher frequency, an input circuit, a storage device including a plurality of separate storage means, switching means for dividing the signals received over said input circuit in each cycle into segments including means for coupling each different segment to a different one of said storage means for storage therein, a plurality of sampling means connected to operate in sequence to generate sampling signals at successive time intervals at said second frequency, a plurality of signal derivation means, first connector means for connecting each signal derivation means to an associated one of said sampling means, and second connector means connecting each signal derivation means to a different one of said storage means.

5. A converter system as set forth in claim 4 in which each of said sampling means comprises a one shot univibrator circuit including an input circuit for receiving an operating signal, means responsive to said operating signal to provide a sampling pulse followed by a further operating signal, and an output circuit for coupling said sampling pulse over said first connector means to the associated signal derivation means, and said further operating signal to the input circuit for a succeeding one of said sampling means.

6. In a converter system for converting signals provided at a first frequency to signals of a second frequency which includes a plurality of storage means, each of which storage means stores a different one of said signals received at said first frequency; the improvement comprising sampling means for generating sampling signals at said second frequency rate, signal derivation means coupled to said storage means operative as energized by successive ones of said sampling signals to derive a signal from a successive one of said storage means which is of a value related to the signal stored in the storage means, an output circuit coupled to said signal derivation means for transmitting said derived signals to associated equipment, and circuit means for coupling said sampling signals to said signal derivation means at said second frequency.

7. A converter system as set forth in claim 6 in which said storage means includes at least one storage device, and said signal derivation means includes a first voltage coupling device connected to said storage device, and said circuit means includes at least one coupling capacitor connected between said first voltage coupling device and said sampling means and in which said output circuit includes a second voltage coupling device connected to the junction of said capacitor and said first voltage coupling device.

8. In a converter system for converting signals provided at a first frequency to signals of a second frequency including a storage device having a plurality of storage members for storing signals input to the storage device at said first frequency rate, the improvement comprising sampling means for generating sampling signals at said second frequency, a readout circuit means for each of said storage members, each of which includes a coupling capacitor connected to said sampling means and a voltage coupling device connected to said coupling capacitor, and signal derivation means coupled to each storage member and connected to the junction of said coupling capacitor and said voltage coupling device for its associated storage member, said signal derivation means being operative responsive to receipt of a sampling signal over the connected one of said coupling capacitors to provide an output signal to the connected one of said voltage coupling devices which is representative of the stored signal substantially without altering the value of the signal stored on said storage means.

9. In a converter system for converting a set of signals cyclically provided at a first frequency to signals for use with equipment operative at a second different frequency, an input circuit over which signals of said first frequency are received, a storage device including a plurality of separate signal storage means, switching means for dividing said set of signals received in each cycle into measured segments, means connected between said storage means and said switching means to transmit each different segment of the signals to a different one of said storage means for storage therein, and means connected to said storage means for selectively and sequentially providing signals representative of said stored signals at said second frequency substantially without effecting variation of the value of the stored signal.

10. In a converter system for converting signals provided by a radar system having scanning means operative at a first frequency to signals of a second frequency compatible for use in the presentation of a display on the raster of a display device, which raster is horizontally traced at a frequency different than said first frequency, an input circuit over which a set of signals is received in each scan by said radar means, a storage device including a plurality of signal storage means, means for coupling each set of said signals received in one scan of said radar system to different ones of said storage means, signal derivation means connected to each of said storage means for deriving a set of signals from said storage means, means for operating said signal derivation means at a frequency which is compatible with the horizontal trace frequency of the raster, and output means for the signals derived by said signal derivation means.

11. In a converter system for converting terrain representative signals obtained from a radar system having scanning means operative in a cyclic manner to signals compatible for use in the presentation of a display on the raster of a display unit, an input circuit over which terrain representative signals are received from said radar system at the scanning frequency of said scanning means, a storage device including a plurality of signal storage means, means for coupling the signals received in each scan to said storage means for storage thereon in a given pattern, readout circuit means for providing a set of signals from said storage means at a frequency compatible with the frequency of the horizontal trace of the raster, signal level adjusting means for providing progressively changing signal levels in successive line traces of said raster, and means connected to said readout circuit means and said signal level adjusting means for providing video signals to said display unit to provide a display only when said level is exceeded.

12. In a converter seystem for converting terrain representative signals obtained from a radar system having scanning means operative in a cyclic manner to signals compatible for use in the presentation on the raster of a display unit, an input circuit over which signals representative of the profile in the path of the terrain are received from said radar system in a cyclic pattern, a storage device including a plurality of signal storage means, means for coupling the terrain representative signals received in each cycle to said storage means for storage thereon, different segments of the signals received in each cycle being coupled to different ones of said signal storage means, and means for deriving a set of signals successively from each of said storage means during each successive horizontal line trace of said raster, and means controlled by the derived signals to provide a display on said display device representative of the profile of the terrain in the path of the scan.

13. In a converter system for converting terrain representative signals obtained from a radar system to signals for presentation on a display unit, said radar system having scanning means operative in a vertical plane at a first frequency, converter means operative to convert the radar signals to signals of a second frequency including means for transmitting the converted signal to said display to provide a profile of the terrain in the plane of the scan, constant altitude reference means including means operative to provide a horizontal line across the display presentation on said display unit at a preset altitude for reference relative to the terrain profile, and means for effecting adjustment of said horizontal line to different reference positions on the display presentation parallel to the first position of said line.

14. In a converter system for converting terrain representative signals obtained from a radar system to signals for presentation on a display unit, input means for receiving signals at a first frequency which are representative of the terrain in a given vertical plane, converter means operative to convert the incoming signals to signals of a second frequency representative of the profile of the terrain in the plane as coupled to a display unit, aircraft altitude reference means including means operable to provide a horizontal reference line across the display presentation for reference relative to the terrain profile, and means for vertically displacing said horizontal reference line to different horizontal positions for changes of aircraft altitude.

15. In a converter system for converting terrain representative signals obtained from a radar system for display on the raster of a display device, and in which said radar system includes scanning means operative to repeatedly scan a vertical segment in the path of the system at a first frequency, converter means operative to convert the radar signals to signals provided by said scanning means of a second frequency which display the profile of the terrain in the path of the scan as coupled to a display unit, altitude reference means operative to provide a horizontal line across said raster for reference relative to the terrain profile including a mixing circuit having clipping means operative to conduct at a predetermined level, means for coupling signals representative of the location of the horizontal line to be displayed on the raster to said clipper means in said mixing circuit, means for coupling vertical sawtooth signals generated at the vertical frequency rate of the raster to said clipping means in said mixing circuit, and means for coupling the output signals of said mixing circuit to said display unit.

16. In a converter system for use with a display unit, input means over which signals representative of a section of a terrain are received at a first frequency, converter means operative to convert the received signals to signals of a second frequency which trace the profile of said terrain as coupled to the display unit, and range line circuit means coupled to said display unit including means operable to provide spaced vertical marker lines on the display unit as a reference of the range between the different points of the terrain profile.

17. In a converter system for use with a display device which provides a raster presentation, input means for receiving incoming signals at a first frequency which are representative of a section of terrain, a storage device including a plurality of signal storage means, means for coupling said signals from said input means to said storage means for storage thereon in a given pattern, signal derivation means coupled to said storage means for deriving a set of signals from said storage means compatible with the frequency of the horizontal trace of the raster of said display device, a plurality of gating means operative in sequence to energize said signal derivation means during each horizontal line trace of said raster, means controlled by said signals provided by said signal derivation means to trace the profile of the terrain in the path of the scan, and range line circuit means coupled to said display device including at least one circuit for coupling signals from one of said gating means to said display device to effect the display of a vertical range marker line on the raster.

18. In a converter system for converting incoming signals received cyclically at a first frequency to signals for presentation on the raster of a display device having a horizontal trace rate of a second frequency, an input circuit over which incoming signals are received, a storage device including a plurality of signal storage means, switching means for dividing the incoming signals received over said input means in each cycle into segments of measured duration, means for coupling each different segment of the signals to a different one of said storage means for storage therein, means for selectively generating sampling signals at said horizontal trace frequency rate of said raster, signal derivation means operative in response to the receipt of said sampling signals to provide output signals from said storage means related to the value of the stored signals without effecting variation of the value of the stored signals, clipper circuit means, coupling circuit means for coupling said output signals provided by said signal derivation means to said clipper circuit means, means in said clipper means operative to conduct only responsive to signals which are greater than a given value during the initial line traces of each raster, and sawtooth generator means for providing a vertical sawtooth signal to said clipper circuit means at the vertical trace rate.

19. A converter system as set forth in claim 18 which includes an integrating circuit connected in the input means for said clipper means.

20. In a converter system for converting incoming signals received cyclically at a first frequency to signals for use in the presentation of a display on the raster of a display device having a source of horizontal sync pulses for providing a horizontal trace rate of a frequency higher than said first frequency, an input circuit over which the incoming signals are received, a storage device including a plurality of signal storage means, switching means for dividing the incoming signals received over said input circuit in each cycle into segments of measured duration, means for coupling each different segment of the signals provided by said switching means to a different one of said storage means for storage therein, sampling means for providing sampling signals, means for coupling horizontal sync pulses at the horizontal trace frequency to said sampling means, said sampling means being operative to generate a chain set of sampling pulses in response to the receipt of each horizontal sync pulse, signal derivation means coupled to said storage means for providing signals related to the value of the stored signals without effecting significant variation of the value of the stored signal, and means for coupling said chain set of signals from said sampling means to said signal derivation means to provide a set of output signals at said horizontal trace rate.

21. In a converter system, an input circuit over which signals representative of each set of a plurality of sets of data are cyclically received, a plurality of storage devices, each of which includes a plurality of separate signal storage members, gate means for dividing each set of data signals received in each cycle into a number of measured segments, means for coupling each different one of the segments of the signals received in a cycle to a different one of said storage devices for storage therein, switch means operative to couple the segments received by each storage device for each of the different data sets in a cycle to a different storage member, and means for selectively effecting readout of said stored signals in a predetermined pattern.

22. In a converter system, an input circuit over which signals representative of each set of a plurality of sets of data are received in a successive pattern, a plurality of storage devices, each of which includes a number of signal storage bins which is the same as the number of data sets, gate means for dividing the signals of each of said data sets into a number of measured segments which is the same as the number of storage devices, means for coupling each different segment of a data set to a different one of said storage devices for storage, switch means operative to couple the segment received by each storage device for each different data set to a different one of its storage bins, said switch means being connected to couple the segments of a set of data to corresponding bins in each of the different storage devices, and means for effecting selective readout of said stored data sets from said storage devices at a frequency rate different than the frequency rate at which said sets of data are received over said input circuit.

23. In a converter system, an input circuit over which signals representative of each set of a plurality of sets of data are cyclically received, a plurality of storage devices, each of which includes a plurality of separate signal storage bins, gate means for dividing the signals of each of said sets received in each cycle which are representative of a set of data into a plurality of measured segments, means for coupling each different segment of the signals received in a cycle to a different one of said storage devices for storage therein, switch means operative to couple the signals received by each storage device for each set to an individual storage bin, and means for effecting readout of each of the sets of data from said storage device in sequence, the segments of a data set being read out simultaneously.

24. In a converter system, an input circuit over which signals representative of each set of a plurality of sets of data are cyclically received, a plurality of storage devices, each of which includes a plurality of separate signal storage bins, gate means for dividing each set of data into a plurality of measured segments, means for coupling each different segment of the signals received in a cycle to a different one of said storage devices for storage therein, switch means operative to couple the segments from each of the different data sets received by each storage device to a different one of its storage bins, a plurality of readout means, each of which is connected to effect simultaneous readout of the bins in the storage devices which store the segments of a data set, and means for enabling each of said readout means in a predetermined pattern to effect successive readout of the different data sets.

25. In a converter system for use with a display device which provides a raster presentation, an input circuit over which signals representative of each set of a plurality of sets of data are cyclically received, a plurality of storage devices, each of which includes a plurality of separate signal storage bins, means for dividing each of the data sets received into a plurality of measured segments, means for coupling each different segment of a data set to a different one of said storage devices for storage, switch means operative to couple the segments received by each storage device for the different sets to a different storage bin in the storage device, and means for providing signals from said storage devices for presentation on the raster of said display device including means for generating in sequence a sampling signal for each data set at the rate of the horizontal trace of the raster and means operative in response to receipt of each sampling signal for a data set to simultaneously provide signals related to the signals stored in the bins of the different storage devices for said data set.

26. In a converter system for use with a display device which provides a raster presentation, an input circuit over which signals representative of a data set for each vertical scan in an azimuth scan of a terrain are received, the signals representative of each azimuth segment being obtained in a vertical scan, a plurality of storage devices, each of which includes a plurality of signal storage bins, a plurality of range gate means for dividing the signals received in each vertical scan into a plurality of measured segments, means for coupling each different segment of the signals received in a vertical scan to a different one of said storage devices for storage therein, switch means operative to couple the segment of each data set received by a storage device in successive vertical scans to a different storage bin in the storage device, sampling means for selectively generating sampling signals at the horizontal rate of the raster, and means responsive to said sampling signals to provide signals in a given sequence for each of the different data sets stored on said storage devices.

27. A converter system as set forth in claim 26 in which each of said range gates means comprises a plurality of gate circuits coupled in cascade manner to operate in a predetermined sequence during each of said vertical scans including means for adjusting the different range gate means to operate for different time durations in a vertical scan.

28. A converter system as set forth in claim 26 in which said sampling means comprise a plurality of gates connected to operate in cascade responsive to the coupling of a signal to the first gate of the plurality, and each gate includes means for providing a sampling signal to a group of bins in said storage devices which store the signals for one of said data sets.

29. A converter system as set forth in claim 26 which includes an output circuit for each storage device, the output circuit for a storage device being connected common to each of the bins in its associated storage device, and in which the signal obtained from each of the storage devices for a data set are coupled to said output circuits simultaneously.

30. In a converter system for use with a display device which provides a raster presentation, an input circuit over which signals representative of each set of a plurality of sets of data are cyclically received, a plurality of storage devices, each of which includes a plurality of separate signal storage bins, gate means for dividing the signals received in each cycle which are representative of a set of data into a plurality of measured segments, means for coupling each different segment of the signals to a different one of said storage devices for storage therein, switch means operative to couple the segments received by each storage device for different data sets to different storage bins, sampling means for sampling as a group the bins in the different storage devices which store a data set, means controlled by said sampling means to selectively provide signals from said bins in said group having a value related in a complementary manner to the value of the signal segments for the one data set stored in said group of storage bins, a separate output circuit for each of said bins in said group, said selectively provided signals being applied to said output circuits, a plurality of clipper circuits, each of which clipper circuits is connected to a different one of said output circuits, and means connecting the output of said clipper circuits to said display device.

31. A converter system as set forth in claim 30 in which each of said clipper circuits comprises a mixer circuit including a first input circuit connected to its associated one of said output circuits, a second input circuit connected to a source of vertical sawtooth waves which occur at the vertical rate of the trace on the display device, a mixer output circuit, and bias means for preventing transmission of the signals from said input circuits to said mixer output circuit which when combined are less than a predetermined value.

32. In a converter system for use with a display device which provides a raster presentation, an input circuit over which signals representative of each set of a plurality of sets of data are cyclically received, a plurality of storage devices, each of which includes a plurality of signal storage bins equal in number to the number of data sets received in a cycle, gate means for dividing the signals received in each cycle which are representative of a set of data into a plurality of measured segments equal in number to the number of storage devices, means for coupling each different segment of the signals to a different one of said storage means for storage therein, switching means operative to couple the signals received by each storage device for each different data set to a different one of the storage bins in the storage device, means for simultaneously providing output signals of a value related to the signals stored in the storage devices for one set of data, clipper means for transmitting the output signals for a data set to a display device including means operative with progression of a raster trace on the display device to provide a progressively different blocking level for said output signals, signals of only a predetermined higher level being transmitted to the display device during the earlier line traces of the raster, and signals of increasingly lower level being transmitted to the display device as the raster trace progresses, and signal level means for adjusting at least certain ones of the signals output from said clipper means in a data set to different values to provide different levels of intensity on the display device for different segments of the data set.

33. In a converter system for use with a display device having a raster presentation, input means for receiving signals representative of a set of data for display on said display device, means for time-dividing the signals of the said data set into a plurality of different segments, storage means for storing the different segments of said signal set, clipper means, means operative with progression of said raster trace on said display device to establish progressively different levels of conduction by said clipper means for the stored signal segments of the set, means for coupling the signals on said storage means to said clipper means in successive time periods of said raster, said clipper means providing conduction of signals of a higher level in the set to the display device during the earlier line traces and signals of an increasingly lower level to the display device as the raster trace progresses, and means for coupling the output of said clipper means to said display device.

34. In a converter system having means for providing signals representative of a set of terrain data for display on a display device which provide a raster trace, means for providing signals representative of different segments of said set, a plurality of control means each of which is connected to receive a different one of said segments, means in each control means operative with progression of the raster trace to provide an output signal only in response to a signal of a first predetermined level during the earlier line traces, and in response to signals of an increasing level as the raster trace progresses, means for simultaneously coupling said signals of said data set to said control means a plurality of times in each raster presentation, and signal level determining means connected to said control means to adjust the value of the output signals from the different control means to different values whereby different ones of the segments as presented on the display device are displayed at different intensities on the device.

35. In a converter system having means for providing signals representative of a set of terrain data for display on a display device which provides a raster trace, means for dividing said signals into a plurality of different segments, a plurality of paths, each of which is connected to conduct a different segment of said signal set, a plurality of clipper circuits, means connecting each clipper circuit to a different one of said paths, means operative with progression of a raster trace to bias each of said clipper circuits to conduct the signal segment on its path to the display device at a progressively different level, an output circuit for each clipper circuit, and a plurality of signal level determining means, each of which is operative to provide a signal of a different predetermined value, and means connecting each signal level determining means to a different one of said output circuits to provide different shades of gray on the display for the segments provided by the different clipper circuits.

36. In a converter system having readout means for simultaneously providing signals representative of a set of terrain data for display on a display device which provides a raster trace, range gate means for dividing the signals of each set into a plurality of different segments, a plurality of paths, each of which is connected to conduct a different segment of said signal set, sampling means for applying said signal set to said paths a plurality of times in each raster trace, a plurality of clipper circuits for providing video output signals, means connecting each clipper circuit to a different one of said paths, means biasing each clipper circuit to provide an output signal in response to input signals of predetermined values, bias adjustment means operative with progression of the raster trace to change the conductivity level of said clipper circuits to a progressively different level, whereby said clipper circuits provide an output signal in response to a signal segment of a first level during the earlier line traces, and a signal segment of a different level as the raster trace progresses to the later line traces, a plurality of signal level determining means, means connecting each of said signal level determining means to the output of a different one of said clipper circuits, adjustable means in each signal level determining means for providing a predetermined value signal for the output signal which is provided by its associated clipper circuit, the adjustable means in the different signal level determining means being adjusted to provide signal outputs of different values, and means connected to said signal level determining means for controlling transmission of the output signal to said display device of only the one of the clipper circuits which is providing an output signal and has its adjustable means adjusted to provide the highest value output signal.

37. A converter system as set forth in claim 36 which includes means for operating each of said range gate means for different elevational angles of a vertical antenna scan, and in which said adjustable means for the ones of the clipper circuits which provide the video signals in response to signals received during the higher elevational angles of the scan includes means set to provide the lowest value output signal, and said adjustable means for the ones of the clipper circuits which provide the video signals for the successively lower elevational angles are adjusted to provide output signals of correspondingly increased value, whereby the closer ranges are displayed at a higher signal level.

38. A converter system as set forth in claim 36 in which said sampling means is operative to couple the signals of said data set over said paths to said clipper circuits at the frequency of the horizontal trace of the raster, and in which said bias adjusting means for changing the conductivity level of said clipper means includes means for providing a changing bias at the vertical trace rate.

39. A converter system as set forth in claim 36 in which said signals provided to represent a set of terrain data are obtained by a vertical scan in the path of an aircraft, and which includes means operative to vary the bias level provided by said bias adjustment means for said clipper circuits to different values with changes in pitch and altitude of the aircraft.

40. In a converter system for providing signals for display on a video display device having a raster presentation, means for receiving signals representative of the terrain which lies in a given vertical plane, means operative to store the received signals in a predetermined sequence, and readout circuit means operative to derive signals successively from each of said stored signals in each horizontal scan of the raster, and means connected to said readout circuit means for providing video signals to said display device to outline the profile of the terrain in said vertical plane during said raster presentation on the display device.

41. In a converter system for providing video signals for display on a video display device having a raster presentation, means for receiving signals representative of the elevation and range of the terrain which lies in a plurality of vertical planes located at different azimuth headings, means connected to store the received signals in a predetermined pattern, readout means operative to derive signals from said stored signals at a frequency related to the horizontal trace frequency of said raster, means connected to said readout means for providing a video signal only in response to derived signals which are in excess of a predetermined value, means for changing said predetermined value during successive line traces of said raster, and means for modulating said raster with said video signals to provide transverse profile lines in an elevational display of the terrain at said predetermined ranges and azimuth headings on said display device.

42. A converter system as set forth in claim 41 which includes means for adjusting the intensity of the signals which modulate the display between profile lines ranging from a lighter intensity at the closer ranges and darker intensity at the farther ranges.

43. In a converter system for providing video signals for display on a video display device at a predetermined operating frequency, means for receiving signals representative of the elevation and range of the terrain which lies in a plurality of vertical planes located at different azimuth headings, means connected to store the received signals in a predetermined pattern, and means operative to derive signals from said stored signals at a frequency related to the operating frequency of said display device, including means responsive to said derived signals for providing transverse profile lines for the terrain at said predetermined ranges and azimuth headings on said display device, and horizon generator means for providing a horizon line at a fixed predetermined location on the display, and means for adjusting the display of the terrain upwardly and downwardly with said horizon line.

References Cited by the Examiner

UNITED STATES PATENTS

| | | | |
|---|---|---|---|
| 2,426,189 | 8/1947 | Espenschied | 343—7.9 |
| 2,806,216 | 9/1957 | Fryklund | 343—7.9 |
| 2,822,536 | 2/1958 | Sandretto | 343—17.1 |
| 2,896,203 | 7/1959 | Wright et al. | 343—7.7 |
| 2,984,790 | 5/1961 | Mallebrein | 328—14 |
| 3,081,456 | 3/1963 | Waer | 343—7 |
| 3,119,106 | 1/1964 | Burtner et al. | 343—7.9 |
| 3,127,604 | 3/1964 | Herriott | 343—5 X |
| 3,146,441 | 8/1964 | Miller | 343—11 |

CHESTER L. JUSTUS, *Primary Examiner.*

LEWIS H. MYERS, *Examiner.*

J. CROWELL, R. M. SKOLNIK, T. H. TUBBESING, *Assistant Examiners.*